US008857643B2

(12) United States Patent
Fetzer

(10) Patent No.: US 8,857,643 B2
(45) Date of Patent: Oct. 14, 2014

(54) VESSEL FOR STORING A FUEL AND/OR OPERATING MEDIUM FOR VEHICLES

(75) Inventor: Horst Fetzer, Suessen (DE)

(73) Assignee: MAGNA STEYR Fuel Systems GmbH Werk Schwäbisch Gmünd, Schwäbisch Gmünd (DE)

( * ) Notice: Subject to any disclaimer, the term of this patent is extended or adjusted under 35 U.S.C. 154(b) by 151 days.

(21) Appl. No.: 13/393,853

(22) PCT Filed: Sep. 10, 2010

(86) PCT No.: PCT/EP2010/063331
§ 371 (c)(1),
(2), (4) Date: Mar. 21, 2012

(87) PCT Pub. No.: WO2011/029912
PCT Pub. Date: Mar. 17, 2011

(65) Prior Publication Data
US 2012/0181274 A1  Jul. 19, 2012

(30) Foreign Application Priority Data

Sep. 11, 2009  (DE) .......................... 10 2009 029 362

(51) Int. Cl.
*B65D 25/00* (2006.01)
(52) U.S. Cl.
USPC ........................................ 220/86.2; 206/818
(58) Field of Classification Search
USPC ......... 220/86.2, 669, 86.1, DIG. 33; 206/818, 206/0.6
See application file for complete search history.

(56) References Cited

U.S. PATENT DOCUMENTS

| 3,738,527 | A | * | 6/1973 | Townsend ................. 220/592.25 |
| 3,813,904 | A | * | 6/1974 | Wallskog ............... 220/DIG. 33 |
| 5,937,922 | A | * | 8/1999 | Hor et al. ..................... 220/86.2 |
| 6,193,924 | B1 | | 2/2001 | Huse |
| 8,235,078 | B2 | * | 8/2012 | Horlacher et al. ........... 220/86.2 |
| 2009/0321441 | A1 | | 12/2009 | Horlacher et al. |
| 2010/0219218 | A1 | | 9/2010 | Kogel |
| 2011/0100985 | A1 | | 5/2011 | Tsiberidis |

FOREIGN PATENT DOCUMENTS

| DE | 20 2005 011575 | 11/2006 |
| DE | 10 2006 054208 | 7/2007 |
| DE | 10 2008 049150 | 12/2009 |
| JP | 2005-500943 A | 1/2005 |
| JP | 2009-501104 A | 1/2009 |
| WO | WO 2009 013558 | 1/2009 |

OTHER PUBLICATIONS

Translated JP Search Report for Corresponding JP Pat. App. No. 2012-528374.

* cited by examiner

*Primary Examiner* — Andrew Perreault
(74) *Attorney, Agent, or Firm* — Jordan IP Law, LLC; Todd A. Vaughn

(57) ABSTRACT

A vessel for storing a fuel and/or operating medium for vehicles, in particular, for utility vehicles, having a filler neck for receiving a pump nozzle and a magnet configured to prevent erroneous tank filling. The vessel is formed from a plastic and has a filler neck holder formed in one piece with the vessel. The filler neck holder is shrink-fitted onto the filler neck. The filler neck has an annular chamber in which the magnet is captively accommodated.

23 Claims, 20 Drawing Sheets

VESSEL FOR STORING A FUEL AND/OR OPERATING MEDIUM FOR VEHICLES

CROSS-REFERENCE TO RELATED APPLICATIONS

The present application is a National Stage Application of PCI International Application No. PCT/EP2010/063331 (filed on Sep. 10, 2010), under 35 U.S.C. §371, which claims priority to German Patent Application No. 10 2009 029 362.0 (filed on Sep. 11, 2009), which are each hereby incorporated by reference in their respective entireties.

FIELD OF THE INVENTION

The invention relates to a vessel for storing a fuel and/or operating medium for vehicles, in particular for utility vehicles, having a filler neck for receiving a pump nozzle.

The invention also relates to a fuel tank for utility vehicles, having at least one first storage chamber for a fuel and one second storage chamber for a second fuel or an operating medium or an operating medium component.

The invention also relates to a method for producing a vessel for operating media and/or fuels of utility vehicles.

BACKGROUND OF THE INVENTION

A generic vessel for storing a fuel and/or operating medium is known from EP 1 502 794 A2.

For the operation in particular of utility vehicles operated with diesel fuel, urea or AdBlue is used for the reduction of soot. Here, the urea is generally carried on-board in a separate tank.

To prevent instances of erroneous tank filling in which the tank provided for the fuels is filled with urea, it is conventional for the pump nozzle to be provided with a special closing mechanism. For the actuation of the closing mechanism, the tank provided for urea has, connected to the filler neck, a separate insert piece which bears an annular magnet in its wall. It is the intention here for a pump nozzle which is matched in terms of its shape to the inner shape of the insert piece to be inserted so far into the filler neck and into the insert piece retained therein that the annular magnet surrounds the pump nozzle at a region in which the closing mechanism is arranged in the pump nozzle. The closing mechanism in the pump nozzle is opened up exclusively by the action of the annular magnet. The intention of this is to reliably prevent instances of erroneous tank filling in which fluid tanks not provided with an associated insert piece with an annular magnet are filled with urea.

Conversely, it is sought to prevent erroneous tank filling of urea tanks with fuel by virtue of the insert piece requiring a certain shape of the pump nozzle or of the spout of the pump nozzle, such that pump nozzles for fuel tank filling do not fit into the insert piece provided in urea tanks.

Such a solution is also known from the generic document EP 1 502 794 A2. The tank known from the generic document is formed from plastic. Here, the plastic tank has, in the region of a filling opening, a tank neck with a collar extension. A separate filler neck as a support for a closure cap is fastened to the tank neck. Furthermore, there is mounted on the tank neck an erroneous tank filling insert which bears an annular magnet in its wall. The erroneous tank filling insert is connected to the tank neck by virtue of the erroneous tank fining insert being fastened to a collar piece which serves as a retainer and which is supported with an encircling flange on the upper edge of the tank neck and which projects into the tank neck. Here, the flange is connected via screws to the upper edge of the tank neck. The collar piece to which the erroneous tank filling insert is fastened also serves for fastening the filler neck to the closure cap. Here, the fastening is realized by spot welding.

A disadvantage of EP 1 502 794 A2 is the complicated construction involving a large number of parts, and the resulting high production and assembly outlay.

DE 20 2005 011 575 U1 discloses a filler neck for a vessel composed of plastic for preventing erroneous filling of the vessel. The filler neck can be closed off by a closure cap. It is the intention for a plastic holder for a permanent magnet to be inserted into the filler neck. It is provided here that the plastic holder which receives the permanent magnet is directly connected in a liquid-tight fashion to the filler neck. It is thereby sought to achieve that only a single component provided with the permanent magnet is arranged in the filler neck, which component as an insert part together with the filler neck allows the permanent magnet to be held in a liquid-tight manner.

Via the solution presented in DE 20 2005 011 575 U1, although the number of components required is reduced in relation to the solution in accordance with EP 1 502 794 A2, there is still a need for a relatively high level of constructional outlay. Furthermore, the filler neck must be mounted on, preferably welded to, a vessel composed of plastic, in a way not described in any more detail in DE 20 2005 011 575 U1.

SUMMARY OF THE INVENTION

It is the object of the present invention to provide a vessel which is suitable for acting on a closing mechanism of a pump nozzle and which can be produced in a simple manner and with a small number of components.

It is also the object of the present invention to provide a simple method, which is inexpensive to carry out, for producing a vessel for storing filet and/or operating media.

By virtue of the fact that the vessel in accordance with embodiments is formed from a plastic and has a filler neck holder formed in one piece with the vessel, which filler neck holder is shrink-fitted onto the filler neck, and by virtue of the fact that the filler neck forms an annular chamber in which the magnet is captively accommodated, a vessel is provided which is cheap and which can be produced in a reliable process and which is suitable for opening a closing mechanism of a pump nozzle and with which erroneous tank filling is substantially prevented.

The number of components required is reduced further in relation to the prior art. As a result of the fact that the filler neck holder is shrink-fitted onto the filler neck, it is possible to dispense with a cumbersome screw connection and welding, such as is proposed, for example, in EP 1 502 794 A2. A connection of the filler neck to the filler neck holder via a shrink tit furthermore has the advantage that a connection which can be subjected to high load and which is sealed, in particular a liquid-tight connection, can be produced between the filler neck and the filler neck holder.

Moreover, an additional component is dispensed with as a result of the fact that the filler neck holder is formed in one piece with the vessel.

The filler neck onto which the filler neck holder is shrink-fitted serves firstly for receiving a pump nozzle and secondly for accommodating a magnet via which the pump nozzle can be opened up. Via a suitable inner diameter and/or suitable shaping of the filler neck, it is possible to prevent pump nozzles for liquids with which the vessel should not be filled from fitting into the filler neck.

The vessel in accordance with the invention may preferably be a vessel for storing urea or AdBlue. Pump nozzles for such operating media are generally of smaller diameter than pump nozzles for conventional fuel tank filling, for example, for diesel tank filling.

The plastic vessel with the integrally formed filler neck holder may be produced by known methods. Here, the inventors have identified that the shrinking of the plastic vessel, usually by 3%, after the production thereof can be utilized to shrink-fit the filler neck holder onto a filler neck. That is to say, the filler neck is inserted into the filler neck holder before the filler neck holder is cooled to a temperature encountered normally during later use. The filler neck is preferably inserted into the filler neck holder at a time at which the temperature of the filler neck holder is still as high as possible.

The filler neck may be pressed into the filler neck holder when still in a hot state. The connection between the filler neck and the filler neck holder is preferably realized without additional connecting techniques or without additional connecting mechanism(s).

The filler neck may be formed from any desired material, for example plastic, metal, in particular, steel or aluminum. It is particularly preferable for the filler neck holder to be formed from a plastic. Here, production may preferably take place via injection molding.

Alternatively, or in addition to the fact that the filler neck is inserted into the filler neck holder before the filler neck holder is cooled from a "production temperature" to a later operating temperature, it may also be provided that the filler neck is inserted in a cooled state into the filler neck holder, that is to say in a state in which the filler neck is considerably cooler than the filler neck holder. Since the filler neck subsequently warms up, it expands, whereby the shrink-fitting of the filler neck holder onto the filler neck can be achieved or at least assisted.

This method is independent of the material selection of the filler neck, but is particularly suitable if the filler neck is composed of plastic.

The filler neck may have a suitable structure on its outer circumference, in particular, in the regions which make contact with an inner wall of the filter neck holder. The inventor has recognized that it may be advantageous for not the entire available contact area between the outer circumference of the filler neck and the inner wall of the filler neck holder to be connected to one another by a shrink fit, but rather for suitable contact areas to be formed for the shrink-fitting process. For this purpose, it may be provided that the filler neck has, on the outer circumference thereof, at least one annularly encircling projection or rib onto which the inner wall of the filler neck holder can be or is shrink-fitted.

An annularly encircling projection or an annularly encircling rib are particularly advantageous for having the inner wall of the filler neck holder shrunk on to them, owing to the reduced contact area. Tolerances or other deviations can thereby be compensated. An annularly encircling projection is also expedient because, in this way, it is reliably ensured that the outer circumference of the filler neck is connected to or sealed off against the inner wall of the filler neck holder in a completely liquid-tight manner. This is advantageous in particular if it is provided in accordance with the invention that a cap for closing off the filler opening is screwed, that is to say fitted, onto the filler neck.

A screw connection of a cap to the filler neck holder is in contrast disadvantageous because the filler neck holder cannot so easily be produced with the precision that is possible, for example, with injection molding in the case of the filler neck. It is, therefore, preferable for the filler opening to be closed off by virtue of the closure cap being fitted onto the filler neck.

The filler neck may be provided with an internal or an external thread already during the production thereof, onto which thread the closure cap can be screwed. Alternatively or in addition thereto, it may also be provided that the filler neck is already provided with a seal, preferably an O-ring or the like.

It is advantageous for the filler neck to have a plurality of, preferably at least three, annular projections (ribs) which preferably run in planes parallel to one another and onto which the inner wall of the filler neck holder are shrink-fitted. In this way, a reliable connection, which is secured against tilting, is produced between the filler neck and the filler neck holder. Furthermore, as a result of the multiplicity of annular projections, a particularly sealed connection is realized between the filler neck and the filler neck holder. This is of particular significance if the closure cap is assigned to the filler neck, because in this case liquid must be prevented from being able to emerge between the filler neck and the filler neck holder.

Reinforcement struts, which preferably run axially with respect to the filler neck, may be provided between the annular projections.

It may also be provided in accordance with the invention that, at least in the region in which the filler neck is arranged, the inner diameter of the filler neck holder tapers downward in the direction of the interior space of the vessel. In this way, too, it is possible to obtain a particularly good connection between the filler neck and the filler neck holder, in particular if the filler neck has a shape at least approximately corresponding to the tapering inner diameter of the filler neck holder.

It is advantageous for the annular chamber for accommodating the magnet to be open downwardly in the direction of the interior space of the vessel. The magnet may be positioned so as to surround a pump nozzle when the latter is correctly inserted into the filler neck.

A captively retained arrangement of the magnet in the annular chamber may be realized via various measures, for example, by being clipped, latched, clamped, pressed in, welded or adhesively bonded. It is particularly preferable for at least one encircling wall of the annular chamber to be at least partially provided with projections, barbed hooks, detent elements or the like which engage under the magnet after the latter has been pushed into the annular chamber from below. Here, it may be provided that the wall provided with the barbed hook or the like can deflect radially outward as the magnet is inserted, and moves back into the original position preferably elastically after the magnet has been inserted.

It is also possible for the magnet to be fixed in the annular chamber via an additional component, for example, a circlip or the like.

It is advantageous for the filler neck holder to have at least one narrowing step and/or at least one projection which is designed such that, when the filler neck is inserted into the filler neck holder, the narrowing step and/or the projection are/is situated below the annular chamber. Here, the narrowing step and/or the projection may reduce the available five inner diameter of the filler neck holder, such that the inner diameter of the filter neck holder is smaller than the outer diameter of the magnet, at least in a partial region.

The inventors have recognized that, via such a design, it is possible in a simple and cheap way to prevent the annular magnet, if it should inadvertently leave the annular chamber, from falling into the interior of the plastic vessel and possibly causing damage there.

Here, the narrowing step or the projection for reducing the inner diameter of the filler neck holder need not be of encircling design; it may even suffice for the filler neck holder to have a projection, a lug, a protuberance or the like which ensures that the magnet cannot fall into the interior space of the plastic vessel.

It may also be advantageous for the filler neck holder to form, on its inner wall, an end stop against which a contact surface of the filler neck bears when the filler neck is situated in the intended axial position within the filler neck holder. Here, the end stop may be formed for example as an encircling step. It may furthermore be provided that the contact surface, which bears against the end stop, of the filler neck is realized by the underside of the lowermost annular projection or the lowermost annular rib. The end stop in combination with the contact surface of the filler neck ensures that the filler neck can be positioned precisely at the desired position within the filler neck holder.

It is advantageous for slots, incisions, channels or notches to be formed into the walls, which surround the magnet, of the annular chamber. The liquid accommodated in the vessel can thus wash around the magnet. This embodiment is also suitable for ensuring that the magnet can be inserted into the annular chamber in a particularly simple manner, because the slots, incisions, channels or notches assist a radial or elastic deflection of the wall of the annular chamber.

Furthermore, the embodiment is helpful for compensating possible production tolerances which may possibly be amplified as a result of the vessel in accordance with the invention being exposed to varying temperatures during later operation. Here, it may be provided in accordance with the invention that the slots, incisions, channels or notches are arranged such that liquid can wash around the annular magnet at the inside (inner circular area) and the outside (outer circular area).

To prevent the liquid stored in the plastic vessel from attacking the magnet, it may be provided that the magnet is encased in an epoxy resin layer. Some other, in particular urea-resistant design of the magnet may alternatively also be selected. The magnet may also be sintered into a plastic part or encapsulated in plastic by injection molding.

In a refinement of the invention, it may be provided that the magnet is formed as a permanent magnet or as a magnetizable element or as a magnetized plastic. The inventors have recognized that a magnetized element or a magnetizable element may also be used instead of hitherto conventional permanent magnets. The magnet is preferably an annular magnet. The annular magnet may, for example, be a product marketed under the trade name Elafix®.

The filler neck may be formed in one or more pieces. It is expedient for the filler neck to be formed in one piece. It is, however, also conceivable for the filler neck to be formed in at least two pieces, for example, in order to ensure that that part of the filler neck which accommodates the magnet is not connected to that part of the filler neck which receives the closure cap or to the part which produces the sealing connection between the inner wall of the filler neck holder and the outer circumference of the filler neck.

Alternatively or in addition to a design of the filler neck with annularly and sealingly encircling projections or ribs, it may also be provided that the filler neck holder is shrink-fitted onto the filter neck in only a punctiform manner via detent lugs, barbed hooks or the like. In this case, it may be necessary for the closure cap for closing off the filler opening to be attached to the filler neck holder for example by being screwed on.

The plastic vessel may be produced for example by sintering, in particular rotary sintering, or else via a blowing technique. The plastic from which the plastic vessel is produced may be, for example, polyurethane, polyamide, polypropylene or polyethylene. The plastic used for producing the filler neck may likewise preferably be polyamide, polyurethane, polyethylene or polypropylene.

It may be provided in accordance with the invention that the plastic vessel is part of a utility vehicle tank. Here, it may also be provided that the plastic vessel forms the interior space of a metallic utility vehicle tank. The plastic vessel may be produced in a metallic outer skin of a utility vehicle tank by sintering, preferably rotary sintering. This is suitable in particular also because, for example, urea would attack the metallic outer skin. Since the plastic vessel is produced in the metallic outer skin via a rotary sintering process, a particularly expedient measure is selected because the metallic outer skin of the utility vehicle tank forms the die.

It may also be provided in accordance with the invention that the plastic vessel is formed as a plastic coating or as a plastic internal coating of a utility vehicle tank—produced preferably via a rotary sintering process. This prevents the metallic outer skin from being attacked by the possibly aggressive operating medium. At the same time, the available space within the metallic outer skin is optimally utilized. The plastic sintered layer which forms the plastic vessel can preferably be applied thinly onto the inner wall of the metallic outer skin. The plastic sintered layer can preferably be produced by virtue of the entire outer skin, after the formation thereof, being heated and a plastic powder subsequently being introduced into the interior space of the outer skin. Here, the plastic powder melts on the hot inner wall and thereby forms the plastic sintered layer.

As a result of the metallic outer skin, a high level of stiffness is obtained without the need for large wall thicknesses.

The plastics polyurethane, polyamide, polypropylene or polyethylene already mentioned above are particularly suitable for forming the plastic sintered layer. With the plastics it is possible to realize thin wall thicknesses which nevertheless meet the desired requirements, specifically in particular have the required chemical inertness with respect to the operating media to be carried.

It may be advantageous if the plastic adheres to the inner side of the metallic outer skin. The plastic may be formed with a characteristic via which adhesion is attained. It may possibly be provided that the plastic is reinforced with carbon fibers or the like. Other stiffening inserts may alternatively also be provided.

Via a suitable design of the inlet opening in the metallic outer skin, it may be achieved—if appropriate with the aid of an additional die—that the plastic sintered layer forms the filter neck holder integrally formed with the plastic vessel, in which filler neck holder is then inserted, before the cooling thereof, the filler neck.

The filler neck may be pressed into the rotary body or the filler neck holder, and then pulls on the rotary body or on the filler neck holder as a result of the shrinking process of the rotary body or filler neck holder. It is also possible here if appropriate for sealing rings and the like to also be inserted and, as a result of the shrinking process, to be positioned between the filler neck and the filler neck holder such that a liquid-tight connection is produced between the components.

The metallic outer skin may be formed for example from aluminum or an aluminum alloy. Another metal, for example, steel, high-grade steel or a corresponding alloy, may self-evidently also be used.

The solution in accordance with the invention also makes it possible to realize integrated multiple vessels, in particular double vessels, within one supporting structure or a common metallic outer skin. The integration of the vessels within a common supporting structure can have the advantage that not every component vessel need be fastened to the vehicle frame via two or more brackets, and that the integrated vessel in a unit with further vessels can rather be attached to a vehicle frame via only two brackets.

In accordance with the invention, a fuel tank for utility vehicles may be provided which has at least one first storage chamber for a fuel and one second storage chamber for a second fuel or an operating medium or an operating medium component. It may be provided here that the second storage vessel is realized by a plastic vessel such as has been described above. Here, the vessel which forms the second storage chamber may be connected with the first storage chamber so as to form a unit.

The first storage chamber which may be provided for storing a conventional fuel does not require a plastic sintered layer on its inner side and can therefore be produced cheaply in a known way. The connection to the vessel which forms the second storage chamber may preferably be realized by virtue of face ends of the circumferential walls which form the first and second storage chambers being welded to one another or connected to one another in some other way. Solutions in this regard are already known from the prior art.

In the method in accordance with the invention for producing a vessel for operating media and/or fuels of utility vehicles, it is provided firstly that a metallic outer skin which forms a substantially closed interior space, is heated. A plastic, preferably a plastic powder, is introduced into the interior space, preferably through the inlet opening used later for liquid to be introduced into the interior space. Here, the plastic forms a plastic sintered layer on the inner side of the metallic outer skin. Here, in accordance with the invention, the plastic sintered layer extends through the inlet opening in the metallic outer skin in order to form a filler neck holder there. For this purpose, suitable additional dies may be mounted on the inlet opening in the metallic outer skin, which dies ensure that the filler neck holder takes on the desired shape. Before the cooling of the plastic sintered layer, a filler neck is inserted into the filler neck holder, wherein the filler neck holder is shrink-fitted, as a result of the cooling thereof, onto the filler neck. Here, the filler neck is designed so as to form an annular chamber in which an annular magnet is captively accommodated.

An alternative vessel is designed for storing a fuel and/or operating medium for vehicles, in particular for utility vehicles. For this purpose, the vessel has a filler neck for receiving a pump nozzle. The filler neck is provided with a magnet for acting on a closing mechanism of a pump nozzle. By virtue of the fact that the vessel has a metallic outer skin with an opening for receiving a filler neck holder, and by virtue of the fact that a plastic vessel or a plastic sintered coating is formed within the metallic outer skin on the inner wall of the metallic outer skin via a rotary sintering process, a vessel is provided which is cheap and which can be produced in a reliable process. Here, in accordance with the invention in accordance with claim 26, the filler neck holder which has been inserted into the opening is connected to the plastic vessel or to the plastic sintered coating via the rotary sintering process. Furthermore, the filler neck holder is shrink-fitted onto a filler neck which is designed for receiving a pump nozzle and which forms an annular chamber in which the magnet is captively accommodated.

In comparison with the prior art, the solution in accordance with the invention offers a simple and reliable option for fastening a filler neck holder to a vessel. The number of components required here is reduced because the connection of the filler neck holder is realized via the rotary sintering process. A complex screw connection or weld of the filler neck holder can be dispensed with. The connection produced between the filler neck and the filler neck holder by shrink-fitting can likewise be realized in a simple and cheap manner as has already been described with regard to the solution.

The advantages already mentioned apply analogously to the alternative vessel, with the difference that the filler neck holder is not formed in one piece with the vessel from one plastic but rather is formed as a separate component. A captively retaining or stable connection of the filler neck holder to the plastic of the vessel may preferably be realized by virtue of the filler neck holder being inserted into an inlet opening of a metallic outer skin and being integrally sintered on via a rotary sintering process with which the plastic vessel is simultaneously formed within the metallic outer skin. The filler neck holder is preferably positioned in the inlet opening of the metallic outer skin such that a part of the filler neck holder protrudes outward beyond the metallic outer skin. A particularly good connection of the filler neck holder to the plastic which forms the plastic vessel is obtained if the filler neck holder has, at least in parts, a notch, a groove, an undercut or the like into which the plastic can penetrate during the sintering process.

In an alternative method for producing a vessel for operating media and/or filets of utility vehicles, it is provided firstly that a metallic outer skin which forms a substantially closed interior space is heated. A plastic is introduced into the interior space in order to form a plastic sintered layer on the inner side of the metallic outer skin. The plastic is preferably a plastic powder. A filler neck holder is inserted into the inlet opening in the metallic outer skin, preferably before the introduction of the plastic powder. It is provided here in accordance with the invention that the plastic sintered layer to be formed serves to captively connect, or integrally sinter on, the filler neck holder inserted into the inlet opening of the metallic outer skin Before the plastic sintered layer cools, a filler neck is inserted into the filler neck holder, which filler neck holder is shrink-fitted onto the filler neck as a result of the cooling of the filler neck holder. Here, the filler neck is designed so as to form an annular chamber in which an annular magnet is captively accommodated.

The filler neck is preferably first inserted into the filler neck holder when the latter is already cooling down again. It may however also be provided that the filler neck is inserted into the filler neck holder already before the metallic outer skin is heated, or during the sintering process.

The advantages already mentioned apply analogously to the alternative method, with the difference that the filler neck holder is not formed in one piece with the plastic sintered layer but rather the filler neck holder is a separate component which is captively connected to the plastic sintered layer via the sintering process. For this purpose, it may be advantageous for the filler neck holder to be provided with corresponding recesses, grooves or notches into which the plastic sintered material can penetrate.

In all the embodiments and variants of the invention, it may be advantageous for the inlet opening provided in the metallic outer skin for receiving a filler neck holder to have an inwardly or outwardly stamped edge or an inwardly or outwardly upturned edge. The advantage of this embodiment is that the die for carrying out the rotary sintering process can be mounted in a defined manner. It is generally advantageous for the inlet opening in the metallic outer skin, or the edge of the inlet opening, to be defined or shaped such that the rotary sintering die can be mounted thereon in a defined manner.

In all embodiments and variants, it is advantageous for the plastic sintered layer or the filler neck holder and/or the filler neck to be composed of polyethylene, preferably a copolymer, in particular with adhesive properties.

In all embodiments and variants, it may be advantageous for the filler neck holder to have merely a projection or a narrowing step or a protuberance which is designed such that, when the filler neck is inserted into the filler neck holder, the projection or the narrowing step or the protuberance is situated below the annular chamber of the annular magnet, wherein the projection or the narrowing step or the protuberance reduces the available free inner diameter of the filler neck holder, such that the inner diameter of the filler neck holder is smaller than the outer diameter of the annular magnet, at least in a partial region.

It is advantageous for the filler neck to have at least one ventilation duct, that end of which ventilation duct which is directed toward the interior space of the vessel is at least partially covered by the narrowing step of the filler neck holder, wherein the narrowing step is arranged at an axial distance below the end of the ventilation duct.

It is advantageous for the filler neck to have two or more ventilation ducts and for the filler neck holder to be provided with a narrowing step which at least partially covers that ventilation duct which is closed off or reached last by a rising liquid level in the interior space of the vessel.

It is advantageous for the ventilation ducts to run substantially in the axial direction of the filler neck. The ventilation openings may preferably be in the shape of a circular arc in cross section.

It has proven to be particularly suitable for the projections or the narrowing steps or the protuberances of the filler neck holder to be arranged below the ventilation ducts in the axial direction, such that the ventilation ducts are at least partially covered in the direction of the tank by the respectively associated projection or narrowing step or protuberance. This reduces the risk of urea spraying out of the tank. The narrowing step forms a base arranged offset below the ventilation duct in the axial direction.

It is advantageous for the narrowing step to have a surface directed toward the end of the ventilation duct, wherein the surface is arranged at an axial distance below the ventilation duct and wherein the surface is matched at least approximately to the cross-sectional area of the facing end of the ventilation duct, and at least approximately completely covers the ventilation duct axially in the direction of the interior space.

In a preferred embodiment in which the filler neck holder has only one projection or one narrowing step or one protuberance, it may be provided that the projection or narrowing step or protuberance is aligned with a ventilation duct in the filler neck such that the ventilation duct is substantially covered by the projection or the narrowing step or the protuberance in the direction of the tank interior space. Here, however, the narrowing step is at an axial distance from the end of the ventilation duct. It is advantageous here for the filler neck holder and the filler neck to be positioned in the inlet opening in the metallic outer wall such that the uppermost ventilation duct of the filler neck is covered by the narrowing step or the projection or the protuberance. It has been found that the risk of urea being sprayed out of a ventilation duct is greatest in the case of that ventilation duct whose end facing toward the tank interior is reached last by the rising liquid level in the tank. It is, therefore, advantageous for the ventilation duct to not be rectilinearly continuous but rather to be covered by the projection or the narrowing step or the protuberance such that the urea cannot spray out rectilinearly.

It is advantageous for the narrowing step to be provided with a ventilation bore which produces a connection between the ventilation duct and an air chamber situated above the interior-space-side end of the filler neck holder. The ventilation bore produces a connection between the ventilation duct and an air chamber which is formed when the liquid level in the urea vessel has completely closed off that opening of the filler neck holder which faces toward the tank interior.

BRIEF DESCRIPTION OF THE DRAWINGS

Advantageous refinements of the invention will emerge from the dependent claims. An exemplary embodiment of the invention will be discussed in principle below on the basis of the drawing, in which:

DETAILED DESCRIPTION OF EMBODIMENTS

Figure 1:
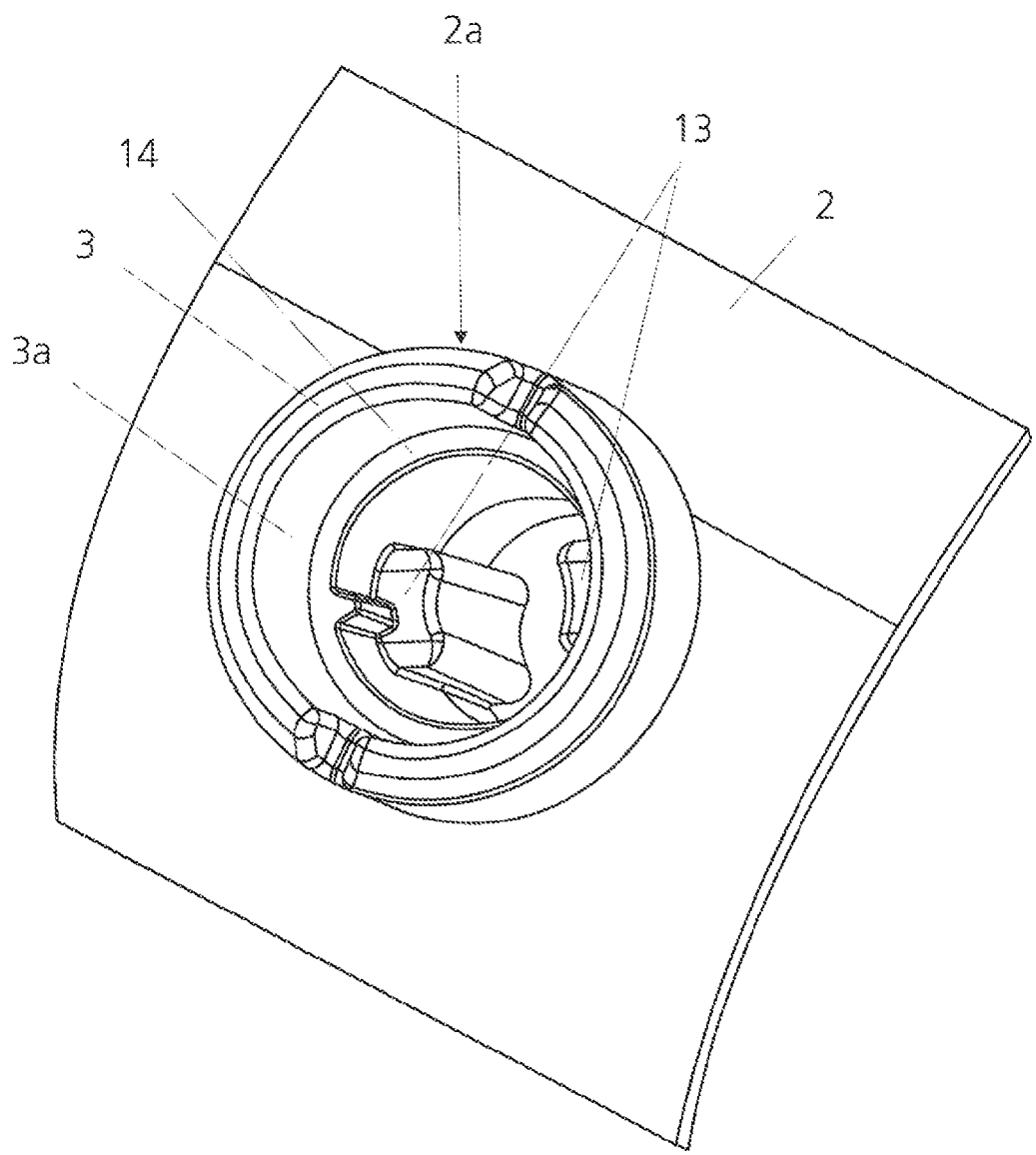
FIG. 1 illustrates a perspective plan view of a filler neck holder formed in an inlet opening of a metallic outer skin.
Figure 2:
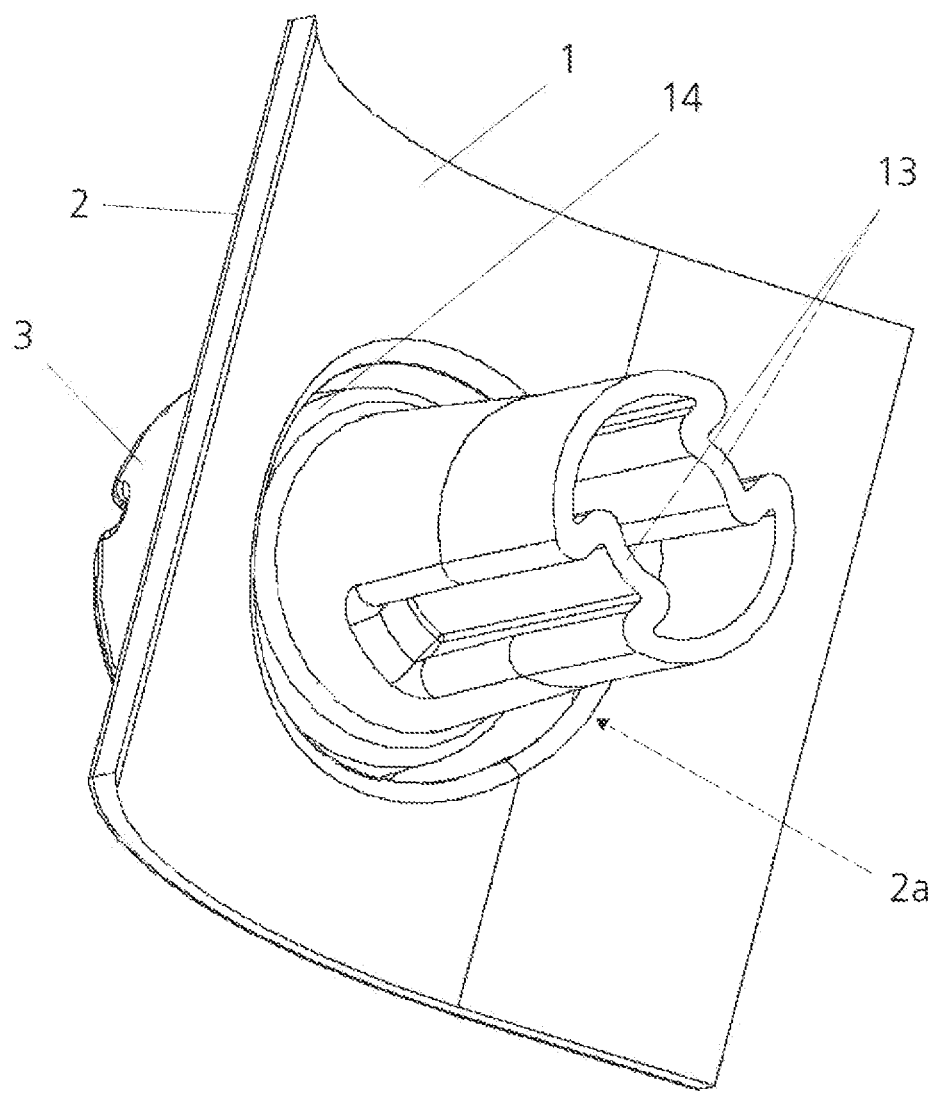
FIG. 2 illustrates a filler neck holder in accordance with FIG. 1 in a perspective illustration from below.
Figure 3:
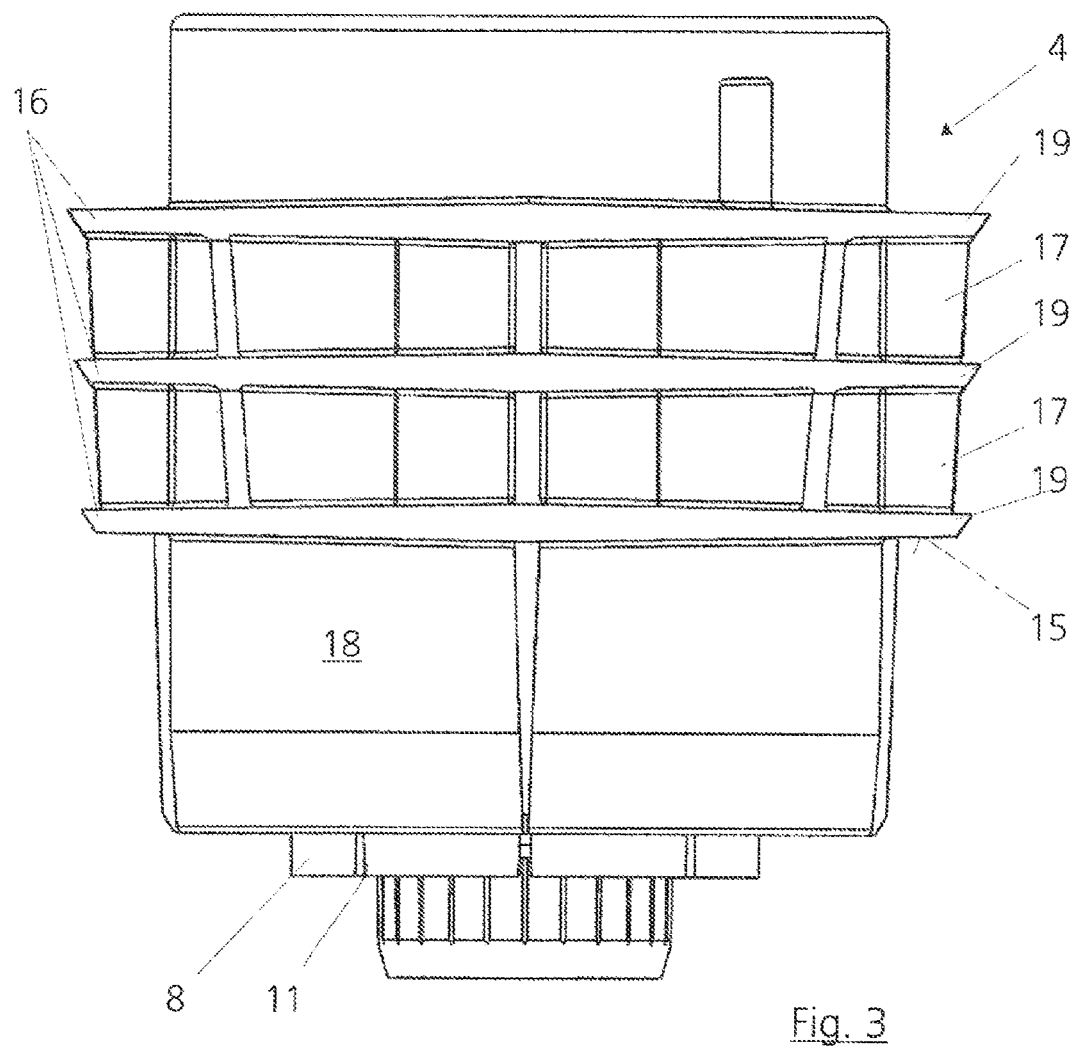
FIG. 3 illustrates a side view of a filler neck.
Figure 4:
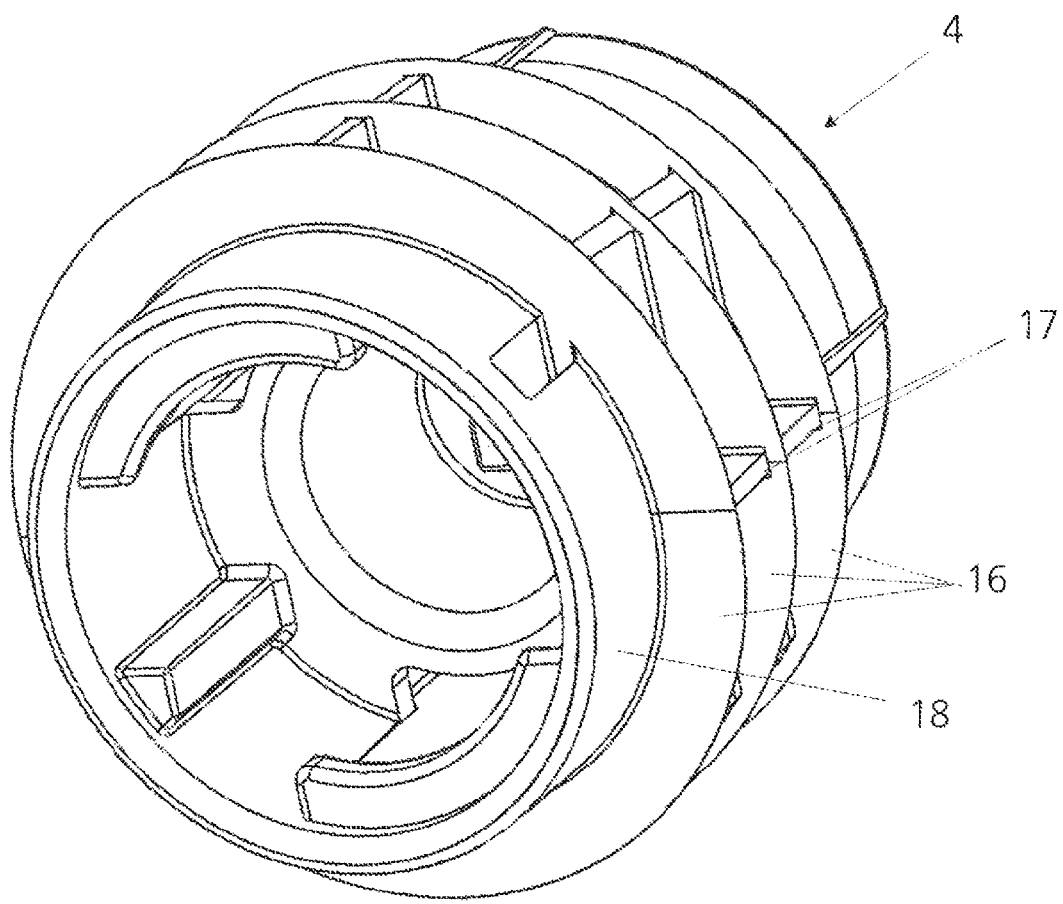
FIG. 4 illustrates a perspective view from above of the filler neck illustrated in FIG. 3.

In an exemplary embodiment, the plastic vessel 1 in accordance with the invention is formed as a plastic coating or plastic internal coating of a metallic outer skin 2 of a utility vehicle tank. The invention is, however, self-evidently not restricted to this; the plastic vessel 1 in accordance with the invention may also be produced without a metallic outer skin. Furthermore, it is provided in the exemplary embodiment of FIG. 11 that the plastic vessel 1 in accordance with the invention provides a second storage chamber of a fuel tank. The solution in accordance with the invention is, however, not restricted to this either. The plastic vessel in accordance with the invention may also be realized as an individual vessel which may if appropriate be provided with a metallic outer skin.

The embodiments presented below, or the individual features in accordance with the invention, apply to all conceivable plastic vessels regardless of their specific production and also regardless of whether the plastic vessel has a metallic skin or whether the plastic vessel is realized as an individual tank or as a component vessel of a larger fuel tank which has multiple component vessels.

FIGS. 1, 2, 8 and 9 show a detail of a plastic vessel 1 for storing an operating medium, in the exemplary embodiment, urea or AdBlue, for a utility vehicle. Here, the plastic vessel 1 is formed as a plastic internal coating of a metallic outer skin 2 of a utility vehicle tank. The plastic internal coating on the inner side of the metallic outer skin 2 may be produced using any desired method; in the exemplary embodiment, the plastic internal coating is produced via a rotary sintering process. In the exemplary embodiment, the plastic internal coating will hereinafter be referred to as plastic vessel 1.

As can be seen from FIGS. 1, 2, 8 and 9, the plastic vessel 1 has a filler neck holder 3 formed in one piece therewith. Here, the filler neck holder 3 extends through an inlet opening 2a in the metallic outer skirt 2. In the exemplary embodiment, the metallic outer skin 2 which surrounds the plastic vessel 1 is produced from aluminum or an aluminum alloy.

Figure 6:
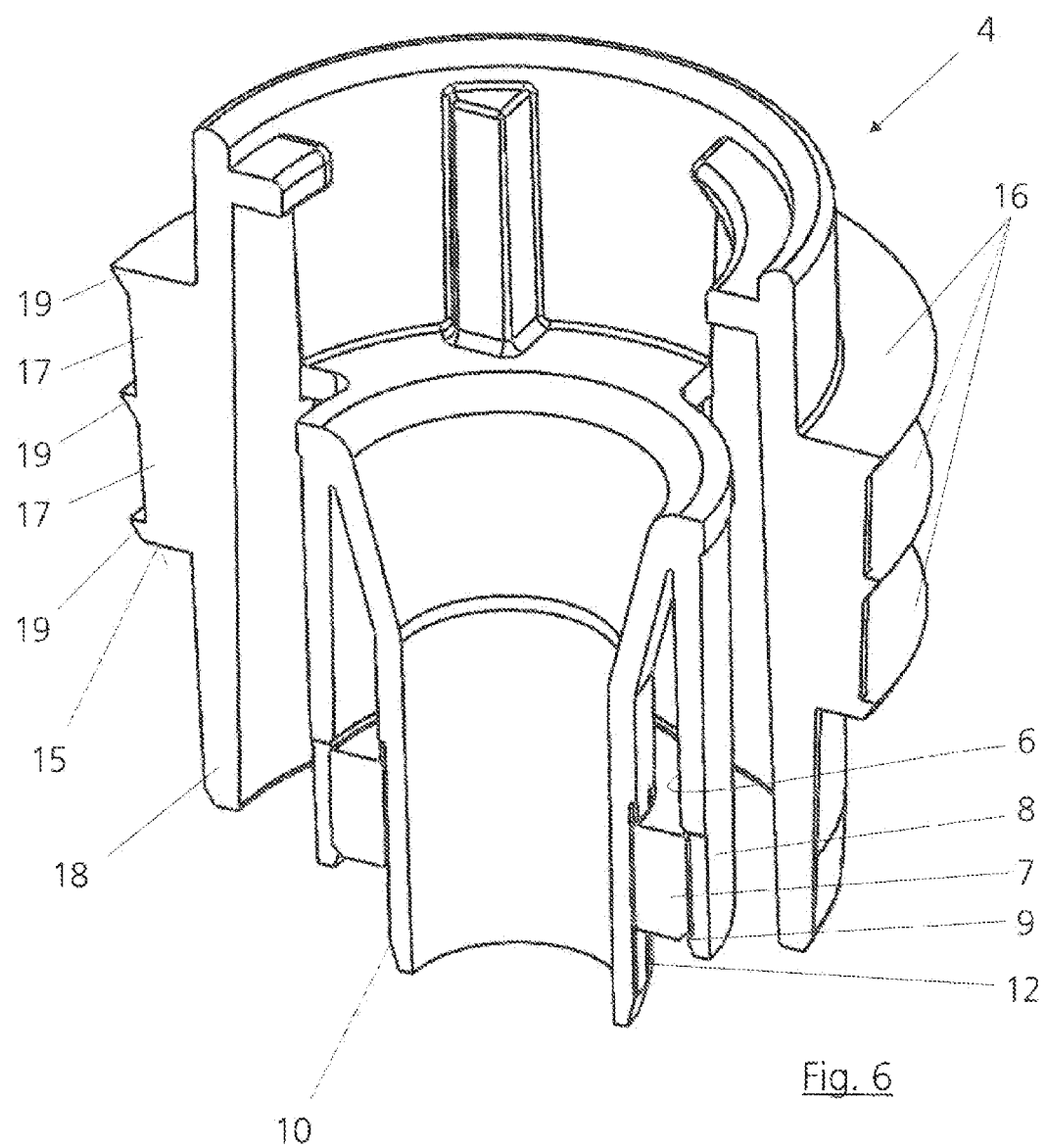
FIG. 6 illustrates the filler neck illustrated in FIG. 3, in a longitudinal section.
Figure 7:
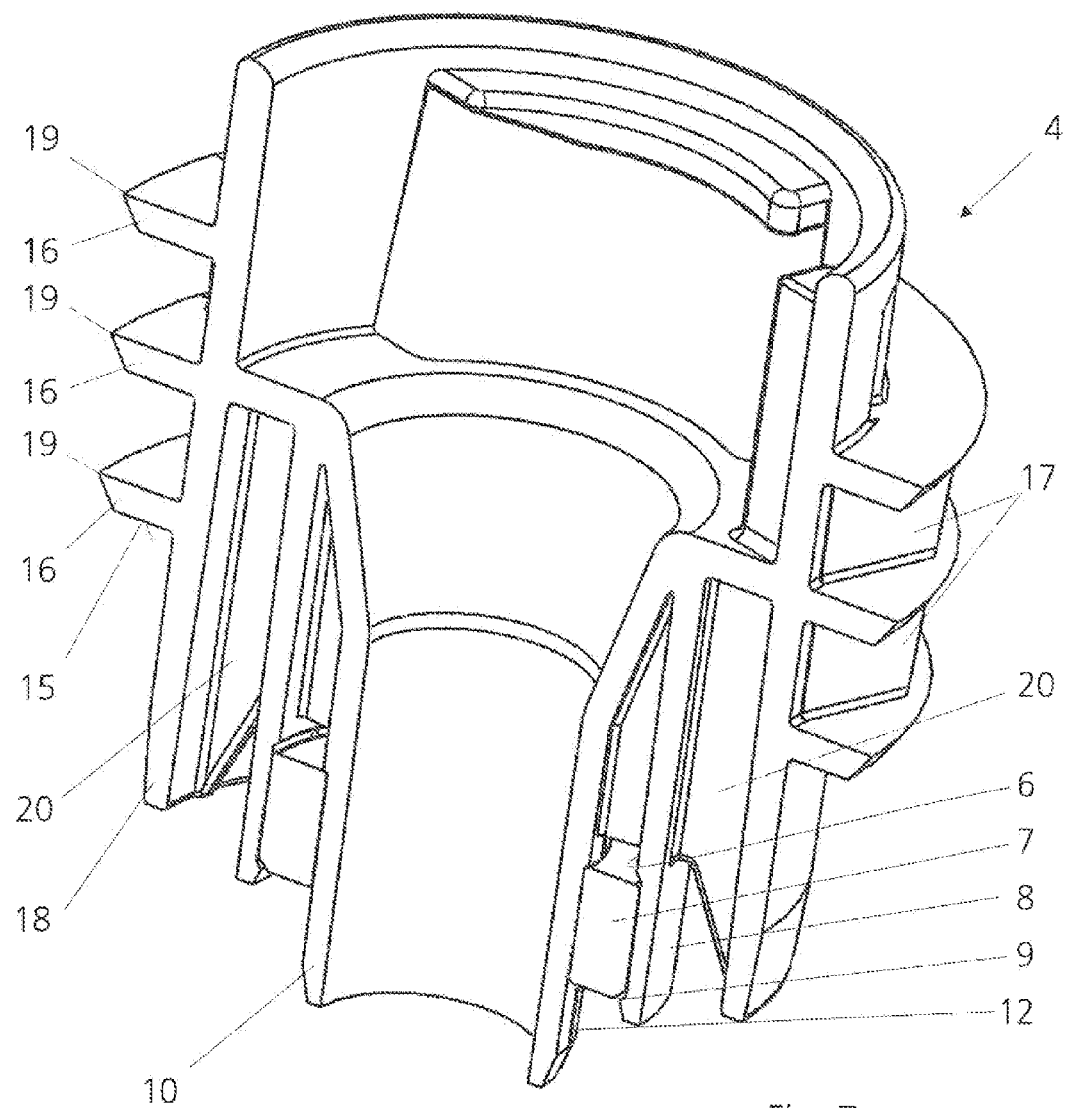
FIG. 7 illustrates a perspective illustration of the filler neck illustrated in FIG. 3, in a further longitudinal section.
Figure 8:
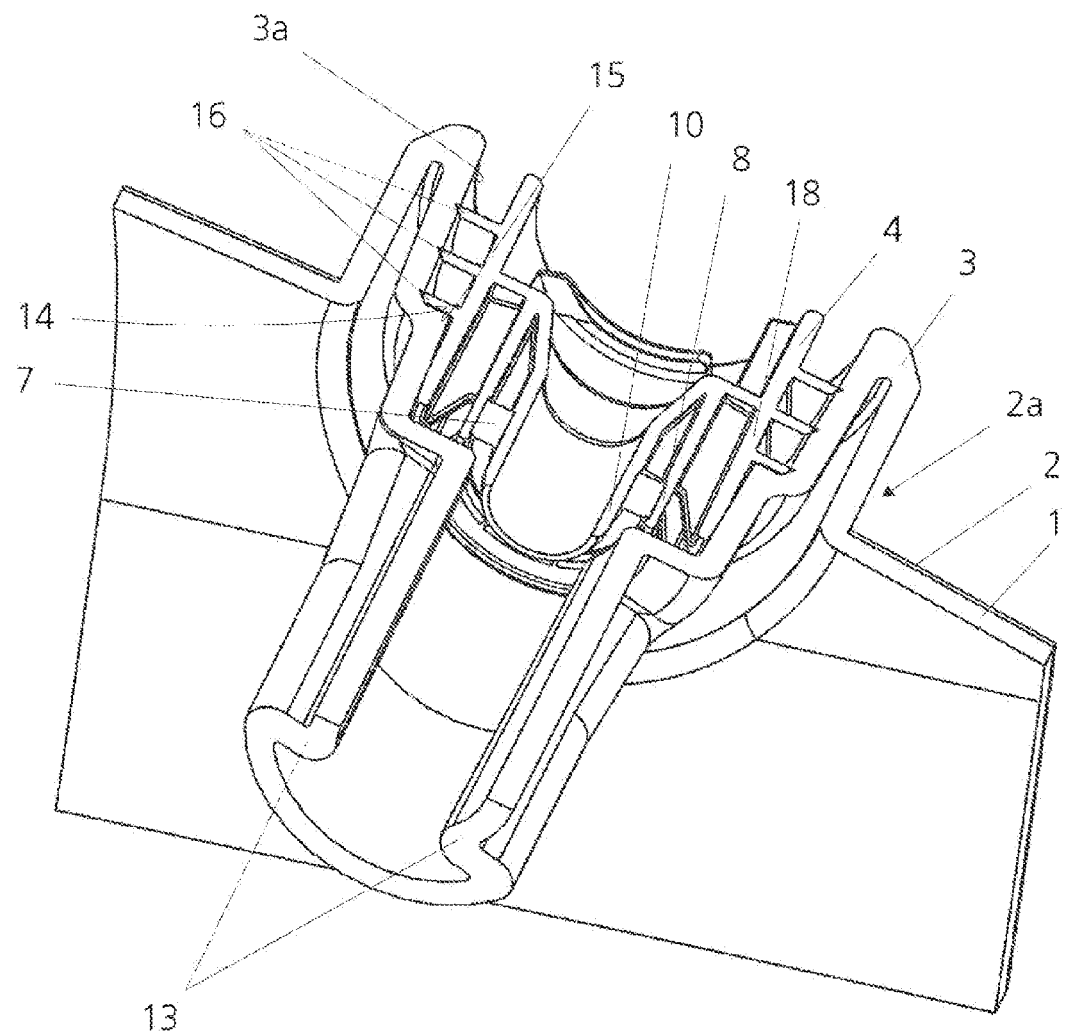
FIG. 8 illustrates a longitudinal section through a filler neck holder into which a filler neck is inserted, in a perspective view.
Figure 9:
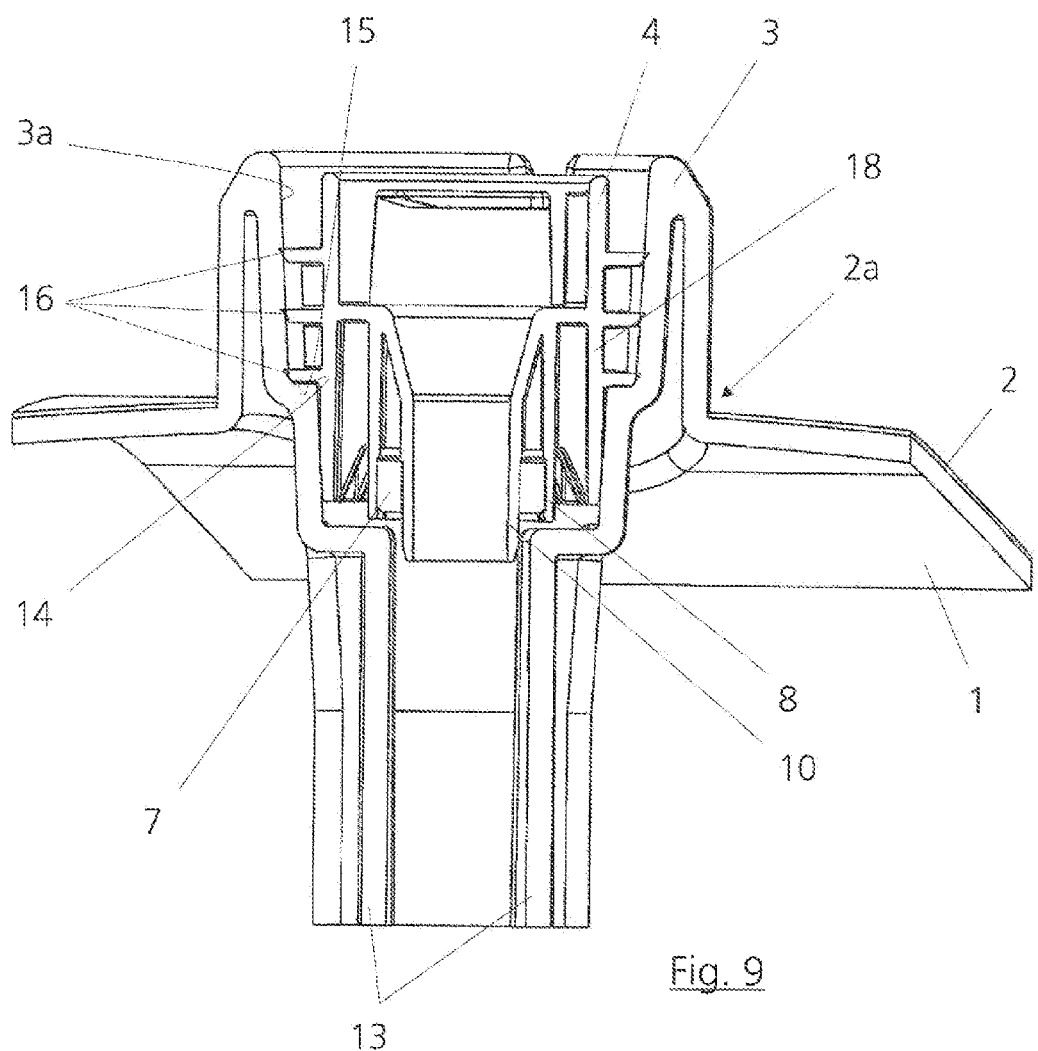
FIG. 9 illustrates a longitudinal section through a filler neck holder into which a filler neck is inserted.

As can be seen in FIGS. 8 and 9, the filler neck holder 3 is shrink-fitted onto a filler neck 4 illustrated in more detail in FIGS. 3 to 7. The filler neck 4 is held in the filler neck holder 3 merely via a shrink fit without additional measures, that is to say, without additional connecting techniques or connecting members. The filler neck 4 serves for receiving a pump nozzle 5 which is diagrammatically indicated in FIG. 11. In the exemplary embodiment, the inner diameter of the filler neck 4 is matched to the usual outer diameter of a pump nozzle 5 for urea.

As can be seen in particular from FIGS. 6 to 9, the filler neck 4 has an annular chamber 6 or a storage chamber for accommodating a magnet 7. The magnet 7 serves to prevent erroneous tank filling and is positioned so as to surround the pump nozzle when the latter is inserted in the usual way into the filler neck 4. Here, the magnet 7 acts on the pump nozzle 5 so as to open the closing mechanism of the latter, such that filling of the plastic vessel 1 is permitted. In the exemplary embodiment, the magnet 7 is formed as an annular magnet. In the exemplary embodiment, the annular magnet 7 is encased in an epoxy resin layer such that it is resistant to urea.

In the exemplary embodiment, the shrink-fit connection between the filler neck 4 and the filler neck holder 3 is realized by virtue of the filler neck 4 being inserted into the filler neck holder 3 before the filler neck holder 3 is cooled after its shaping process. The filler neck 4 is, therefore, inserted into the filler neck holder 3 when the latter is still hot. In the exemplary embodiment, it may additionally be provided that the filler neck 4 is inserted in a cooled state into the filler neck holder 3.

It is provided in the exemplary embodiment that the filler neck 4 is formed from plastic. It is also provided in the exemplary embodiment that the filler neck 4 is produced as an injection molded part. In the exemplary embodiment, the annular magnet 7 is formed as a permanent magnet. It is provided in the exemplary embodiment that the annular chamber 6 is open downwardly in the direction of the interior space of the vessel 1.

In the exemplary embodiment, the annular magnet 7 is fixed in the annular chamber 6 by virtue of an outer wall 8 of the annular chamber 6 being provided, on its underside, with an encircling projection 9 which projects into the annular chamber 6 and which is arranged below the annular magnet 7 when the annular magnet 7 is inserted into the annular chamber 6. Here, the encircling barbed-hook-like projection 9 reduces the distance to an inner wall 10 of the annular chamber 6 such that the distance is less than the thickness of the annular magnet 7.

In the exemplary embodiment, the annular chamber 6 and the annular magnet 7 are matched to one another in such a way that the annular magnet 7 is clamped between the outer wall 8 and the inner wall 10.

Figure 5:
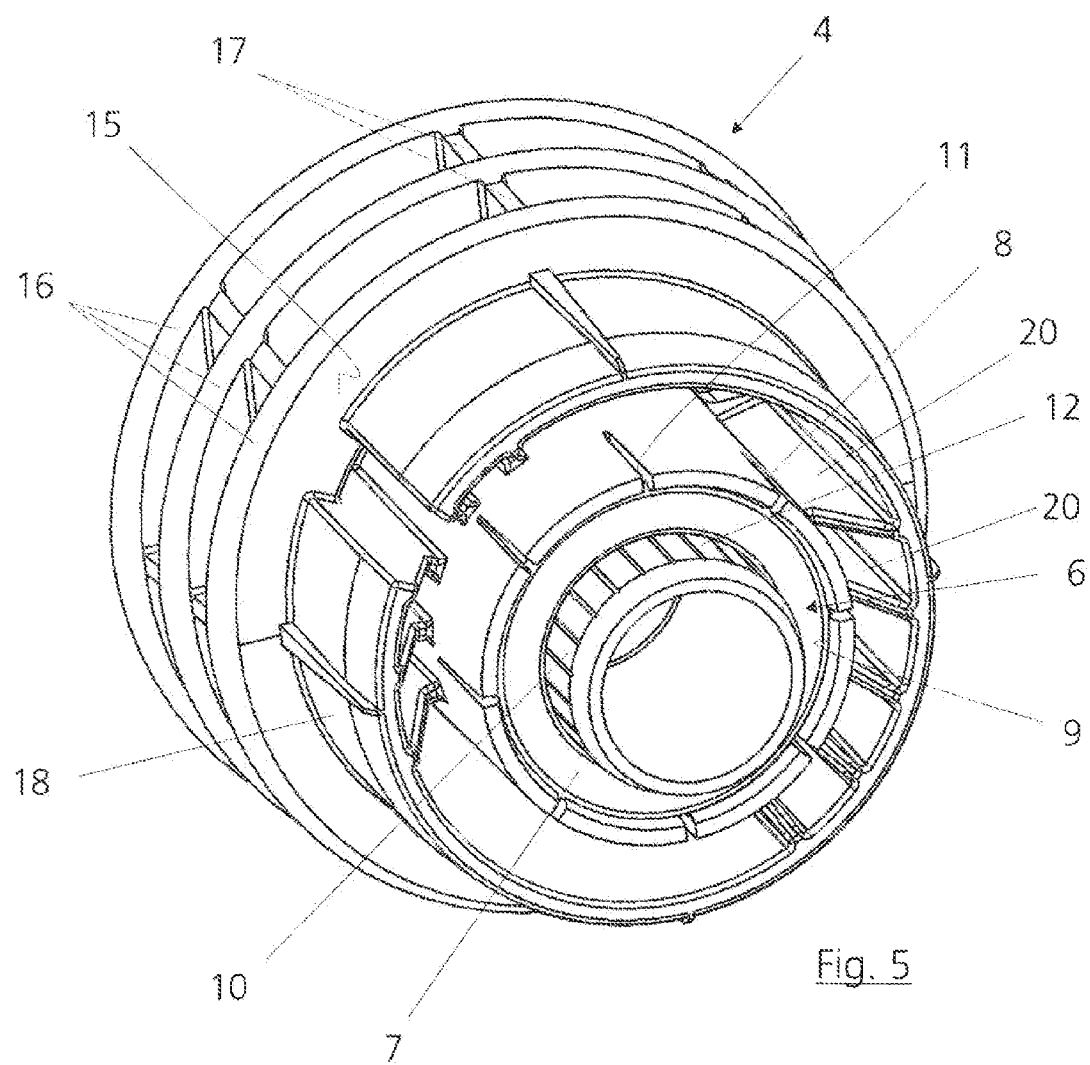
FIG. 5 illustrates a perspective view from below of the filler neck illustrated in FIG. 3.

It can be seen in particular from FIG. 5 that, in the exemplary embodiment, the outer wall 8 of the annular chamber 6 has slots 11 which make it possible for the annular magnet 7 to be held in the annular chamber 6 with a certain preload. Here, the slots 11 also make it possible for tolerances, arising for example on account of production inaccuracies or temperature fluctuations during later use of the plastic vessel 1, in be compensated. Furthermore, the slots 11 make it possible for the liquid stored in the fuel vessel to wash around the annular magnet 7.

As can be seen from FIGS. 5, 6 and 7, the inner wall 10 of the annular chamber 6 also analogously has slots 12 which serve the same purpose. Liquid therefore washes around the annular magnet 7 from both sides, that is to say at the inner side (inner circular area) and the outer side (outer circular area) of the annular magnet 7. Furthermore, both walls 8, 10 can deflect radially slightly as the annular magnet 7 is inserted, and later snap back (elastically) with a corresponding preload such that the annular magnet 7 is situated in the desired position.

As can be seen in particular from FIGS. 6 and 7, the annular chamber 6 has a relatively great axial extent in relation to the annular magnet 7; in particular, the outer wall 8 also has a relatively great axial length in comparison with the annular magnet 7, as a result of which the wall 8 is connected to the filler neck 4 in a region spaced apart from the open lower end of the annular chamber 6 by a relatively great distance. A radial deflection of the outer wall 8 for receiving the annular magnet 7 is thereby assisted.

The inner wall 10 provides an inner diameter or an inner region for receiving the pump nozzle 5 and serves firstly to guide the pump nozzle 5 and secondly to ensure that pump nozzles exceeding a defined diameter cannot be inserted.

As can be seen from FIGS. 1, 2, 8 and 9, the filler neck holder 3 has two projections 13 or narrowing steps or protuberances designed such that, when the filler neck 4 is inserted into the filler neck holder 3, the two projections 13 are situated below the annular chamber 6. The two projections 13 reduce the available free inner diameter of the filler neck holder 3, such that the inner diameter of the filler neck holder 3 is smaller than the outer diameter of the annular magnet 7, at least in a partial region. It is provided in the exemplary embodiment that the projections 13 are formed opposite one another and enclose approximately an angle range of 30 to 90°. This form may also serve to increase the stability of the filler neck holder 3.

As can also be seen from the figures, the filler neck holder 3 has, on its inner wall, an end stop 14. The end stop 14 limits the capability for the filler neck 4 to be inserted, or defines the depth to which the filler neck 4 can be inserted into the filler neck holder 3. As can be seen in particular from FIGS. 8 and 9, the filler neck 4 bears with a contact surface 15 against the end stop 14 when the filler neck 4 is situated in the intended position within the filler neck holder 3, in the exemplary embodiment, the end stop 14 is formed as an encircling step.

The filler neck 4 has, on its outer circumference 18, three annularly encircling ribs 16 or projections, onto the radially outer ends of which the inner wall of the filler neck holder 3 is shrink-fitted. Here, the ribs 16 run in planes parallel to one another. The ribs 16 are arranged spaced apart from one another at regular intervals. Struts 17 spaced apart uniformly from one another are arranged between the ribs 16. The struts 17 extend substantially in axial directions. The underside of the lowermost annularly encircling rib 16 forms the contact surface 16 for contact against the end stop 14 of the filler neck holder 3.

As can be seen in particular from FIGS. 3, 6, 7, 8 and 9, the ribs 16 have, radially encircling on their outer ends, that is to say on the ends onto which the inner wall 3a of the filler neck holder 3 is shrink-fitted, detent lugs 19 for anchoring the filler neck 4 in the filler neck holder 3. Here, the detent tugs 19 taper in a wedge-shaped manner as viewed in longitudinal section. The detent lugs 19 need not imperatively be of annularly encircling form, but rather may also be arranged in each case only in partial regions.

It is provided in the exemplary embodiment that, at least in the region in which the filler neck 4 is arranged, the inner diameter of the filler neck holder 3 tapers downwardly in the direction of the interior space of the vessel 1. It is also provided in the exemplary embodiment that a closure cap (not illustrated in any more detail) for closing off the plastic vessel 1 can be screwed onto or fixed in some other way to the filler neck 4. The filler neck 4 may for this purpose have suitable locking means, for example, a thread.

Furthermore, in the exemplary embodiment, ventilation bores are provided, in a way not illustrated in any more detail, between the outer circumference 18 or the outer wall of the filler neck 4 and the outer wall 8 of the annular chamber 6.

Stiffening walls 20 may be arranged between the outer circumference 18 or the outer wall of the filler neck 4 and the outer wall 8 of the annular chamber 6, which stiffening walls 20 run substantially in the axial direction and form or define, inter alia, the ventilation bores. The stiffening walls 20 increase the stability of the filler neck 4.

Figure 11:
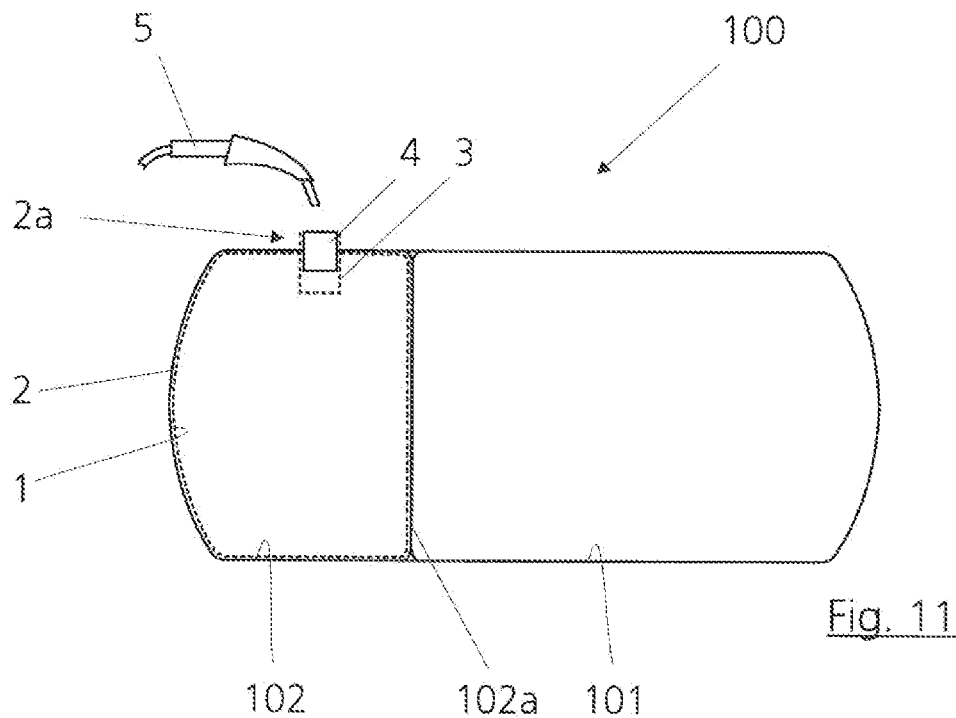
FIG. 11 illustrates a diagrammatic illustration of a fuel tank having a first storage chamber for storing a fuel and having a second storage chamber for a second fuel, an operating medium or an operating medium component, which second storage chamber is provided with a plastic sintered coating and the inlet opening of which second storage chamber is provided with the filler neck holder in accordance with the invention which is shrink-fitted onto a filler neck.

FIG. 11 shows a fuel tank 100 with a first storage chamber 101 for a fuel and a second storage chamber 102 for a second fuel, an operating medium or an operating medium component, in the exemplary embodiment, urea or AdBlue. Here, the second storage chamber 102 is designed as described in the exemplary embodiment as per FIGS. 1 to 9. The second storage chamber 102, therefore, has a metallic outer skin 2 with a plastic internal coating 1, produced preferably by rotary sintering. Here, the plastic internal coating 1 constitutes the plastic vessel 1. Formed in the inlet opening 2a is the filler neck holder 3 formed, in accordance with the invention, in one piece with the plastic vessel 1, onto which filler neck holder a filler neck 4 is shrink-fitted.

The second storage chamber 102 is connected, for example welded, to the first storage chamber 101 so as to form a unit, such that a common fuel tank 100 for a utility vehicle is formed. This may be realized by virtue of the second storage chamber 102 firstly being produced as a separate vessel. The connection to the first storage chamber 101 may be realized, for example, by virtue of an open end side of the circumferential wall of the first storage chamber 101 being welded to an end wall 102a of the second storage chamber 102. It may alternatively also be provided that both end sides of the circumferential wall of the first storage chamber 101 are closed off by separate end walls. The two storage chambers 101 and 102 are, therefore, formed as separate vessels and can be welded to one another in a known way.

It is also possible for that end wall of the storage chamber 102 which is denoted by the reference symbol 102a in FIG. 11 to be formed as a partition which separates the two storage chambers 101, 102 from one another. Here, the partition 102a may be formed from metal or else from a plastic, produced, for example, via a rotary sintering process.

Figure 10:
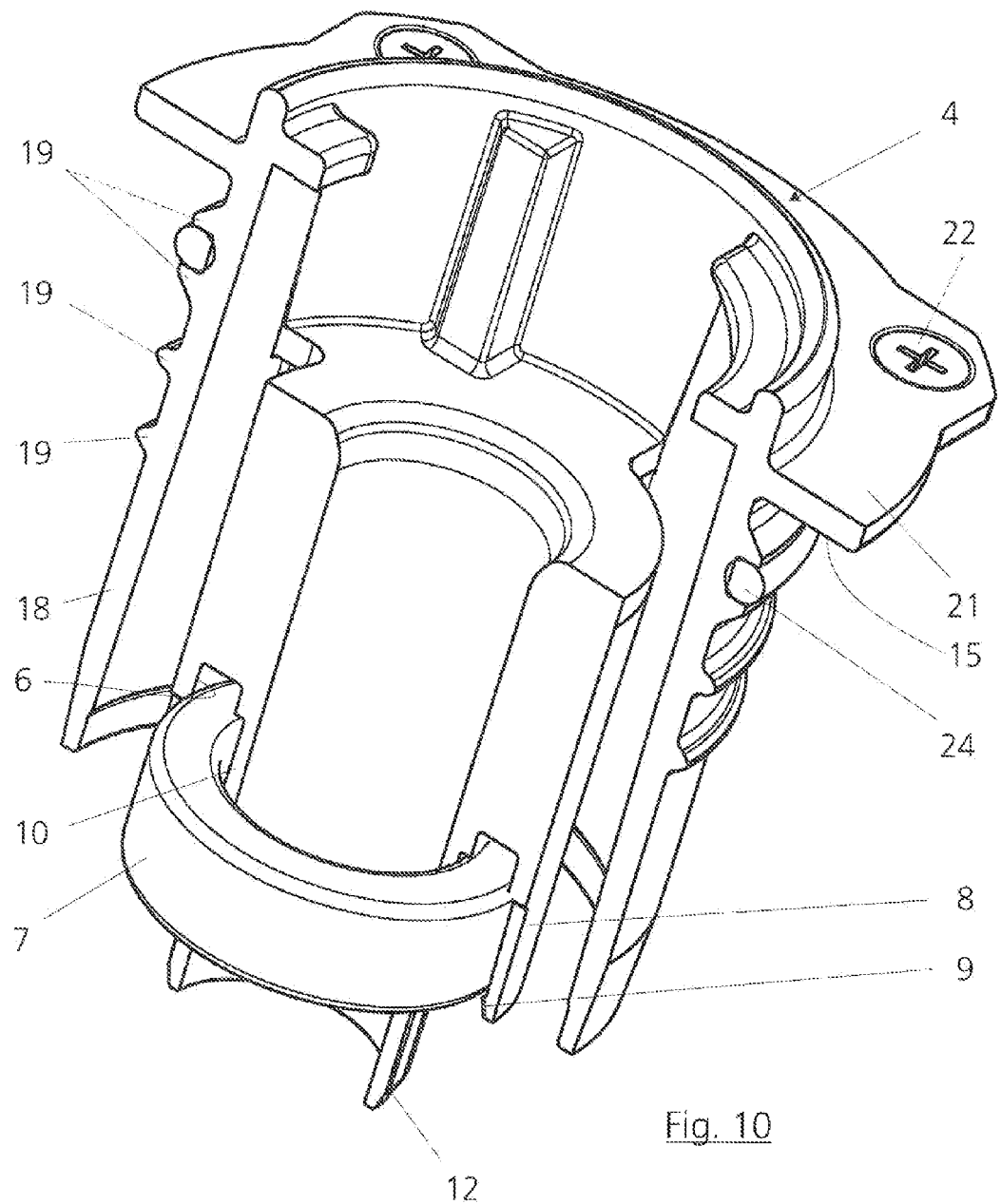
FIG. 10 illustrates a perspective view of a longitudinal section through a filler neck in an alternative embodiment to FIGS. 3 to 9.

FIG. 10 shows an alternative embodiment of the filler neck 4 to that in FIGS. 3 to 9. It is basically possible for all the features, variants and details already mentioned with regard to the filler neck 4 in the version as per FIGS. 3 to 9 to also be realized in the case of the filler neck holder 4 as per FIG. 10, insofar as such features, variants and details are not precluded by the modifications discussed below. The filler neck holder 4 as per FIG. 10 differs from the filler neck holder as per FIGS. 3 to 9 in that, instead of ribs 16, merely detent lugs 19 are formed on the outer wall 18 of the filler neck holder 4. The inventors have identified that production costs can be reduced if merely detent lugs 19 are formed instead of ribs 16 (with detent lugs 19). Furthermore, it has been found that the detent lugs 19 are adequate to allow shrink-fitting of the filler neck holder 3 onto the filler neck 4.

Furthermore, the filler neck 4 illustrated in FIG. 10 differs in that a seal 24 (or if appropriate a plurality of seals) is arranged on the outer circumference 18, such that the seal 24 provides a sealing action between the outer wall 18 of the filler neck 4 and an inner wall 3a of the filler neck holder 3. For this purpose, it is provided in the embodiment illustrated in FIG. 10 that the seal 24 projects (radially) beyond the detent lugs 19. It may also be provided that the seal 24 is inserted, and thereby held, between two detent lugs 19. The seal 24 may preferably be designed as a sealing ring.

The filler neck 4 illustrated in FIG. 10 has, on its upper end, a flange-like widened portion 21 which extends substantially in the radial direction. Here, the flange-like widened portion 21 makes it possible for the filler neck 4 to be fastened via a screw connection, for example, via screws 22. It is preferable for four screws 22 to be provided. The fastening is preferably to the filler neck holder 3, which for this purpose may have a counterpart surface (not illustrated in any more detail). The shrink-fit connection, which is already provided in any case, between the filler neck 4 and the finer neck holder 3 can be assisted via the screw connection. Torques can be transmitted particularly effectively via the screw connection, preferably via the screws 22. Here, the underside of the flange 21 may preferably serve as a contact surface 15 in order, in conjunction with an end stop 14 of the filler neck holder 3, to obtain defined positioning of the filler neck 4. Here, the underside of the flange 21, that is to say the contact surface 15, rests preferably on the top side of the filler neck holder 3, preferably on a counterpart surface which also serves for realizing the screw connection. In this case, the top side or the counterpart surface of the filler neck holder 3 then constitutes the end stop 14 (not illustrated in any more detail).

The features presented in FIG. 10 may also be combined, individually or in any desired combinations, with the embodiment of the filler neck 4 in accordance with FIGS. 3 to 9.

Figure 12:
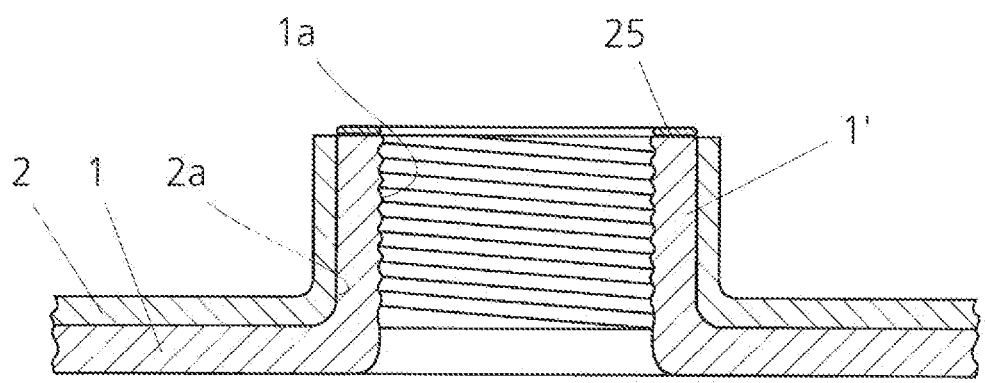
FIG. 12 illustrates a longitudinal section through a filler neck holder which is formed in one piece with the plastic vessel 1 and which is in an alternative embodiment with an internal thread.

FIG. 12 shows two alternative embodiments. In the first embodiment, it is provided that the filler neck holder 3 is formed in one piece with the plastic vessel 1 or the plastic sintered layer 1. This may preferably be realized by virtue of a die which is used for the rotary sintering having a suitable shape such that the plastic which forms the plastic sintered layer 1 on the inner side of the metallic outer skin 2 simultaneously also forms the filler neck holder 3. In addition or alternatively, it may also be provided here that the edge of the inlet opening 2a is bent outward (see FIG. 12), such that on the inner side of the upturned edge there is formed a plastic sintered layer 1' which, as per the first embodiment, forms the filler neck holder 3.

The die which is used for the rotary sintering may have a portion designed such that the filler neck holder 3 is provided, on its inner wall 3a, with an internal thread. Via the filler neck holder 3 as per FIG. 12, it is possible for the filler neck 4 to be connected to the filler neck holder via a screw connection. For this purpose, the filler neck 4 may have on its outer circumference 18 a corresponding external thread. Such a connection may be used alternatively or in addition to a shrink fit. This may also be achieved, for example, by virtue of the internal thread of the filler neck holder 3 extending only over a part of the height of the filler neck holder 3.

In addition or alternatively to this, it may also be provided that the filler neck 4 has a flange-like widened portion 21, as illustrated in FIG. 10, in order to be screwed to the filler neck holder 3 as per FIG. 12 via a corresponding screw connection 22. In the exemplary embodiment as per FIG. 12, the filler neck holder 3 has, on its top side, a seal 25. Here, the seal 25 may provide a sealing action between the filler neck holder 3 and the filler neck 4.

In the second, alternative embodiment as per FIG. 12, it may be provided that the sleeve-shaped portion 1' formed in one piece with the plastic sintered layer 1 is not the filler neck holder 3 but rather merely an extension of the inlet opening 2a In this case, a filler neck holder 3 is formed separately and is connected to the sleeve-shaped part 1' of the plastic sintered layer 1 via a screw connection. When the filler neck holder 3 has been screwed in, a connection to the filler neck 4 can subsequently be realized via a shrink fit.

Figure 13:
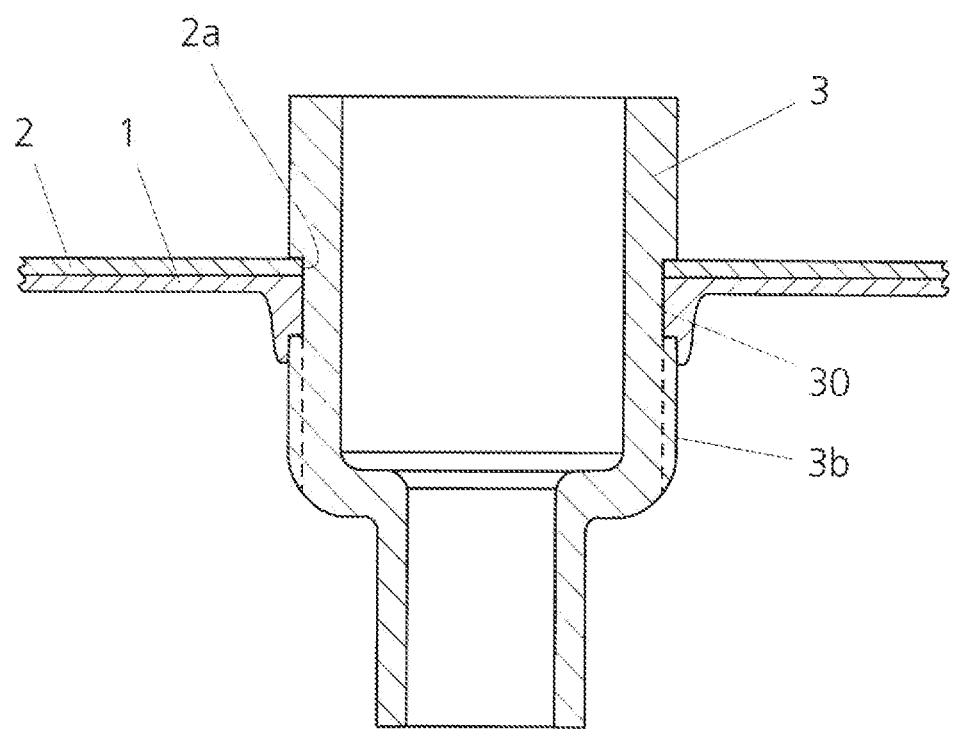
FIG. 13 illustrates a longitudinal section through a filler neck holder formed independently from the plastic vessel.

FIG. 13 shows an alternative embodiment of the filler neck holder 3 in accordance with the invention. It is provided here that the filler neck holder 3 is formed as a separate component independently of the plastic vessel 1 or the plastic sintered layer 1. Here, the filler neck holder 3 is inserted into an inlet opening 2a of a metallic outer skin 2. This takes place preferably such that the filler neck holder 3 protrudes outwardly and inwardly beyond the inlet opening 2a. After the insertion of the filler neck holder 3 into the inlet opening 2a, a plastic is introduced into the interior space of the metallic outer skin 2 in order that the plastic there forms a plastic sintered layer 1 on the inner side of the metallic outer skin 2. As a result, the plastic sintered layer 1 likewise connects to the filler neck holder 3, such that the latter is arranged in a captively retained manner. The filler neck holder 3 is fixed via the rotary sintering process. As a result of the sintering process, the filler neck holder, which is preferably likewise formed from plastic, is also preferably heated such that its plastic preferably melts slightly, resulting in a good connection to the plastic sintered layer.

To improve the connection of the filler neck holder 3, it may be provided that the latter has an incision or a groove 30 or a recess such that the plastic sintered layer 1 can produce a positively locking connection. One possible embodiment of a recess is illustrated by dashed lines in FIG. 13. It is advantageous for the filler neck holder 3 to be able to be placed from the outside onto the metallic outer skin 2, and for a stop to be formed such that defined contact is attained. In particular in the region in which the filler neck holder 3 is arranged within the outer skin 2, the outer wall 3b of the filler neck holder may have any desired form, for example, grooves, a corrugated formation or the like, suitable for permitting a good connection to the plastic sintered layer 1.

An advantage of the embodiment of the filler neck holder 3 as per FIG. 13 is that the filler neck holder 3, by virtue of its being formed separately, may be provided with a suitably large wall thickness, whereas the plastic sintered layer 1 has as small a wall thickness as possible. The wall thickness of the filler neck holder 3 may be, for example, 4 to 10 mm, preferably 6 mm, whereas the wall thickness of the plastic sintered layer 1 is preferably 0.5 to 3 mm, particularly preferably 0.5 to 1 mm.

The filler neck holder 3 illustrated in FIG. 13 is suitable for the connection or fastening of all of the filler necks 4 described above. In an embodiment which is advantageous for all design variants, it may be provided that an edge 200 of the inlet opening 2a is stamped (outward or inward) so as to create a fixing aid for a rotary sintering die.

FIGS. 14 to 21 show a further embodiment of the solution in accordance with the invention. The features described below may be combined, both individually and also in any desired combination or in their entirety, with features of the embodiments in accordance with the figures described above. Equally, the features already described on the basis of FIGS. 1 to 13 may be combined, individually or in any desired combination or in their entirety, with the embodiment as per FIGS. 14 to 21. Below, on the basis of FIGS. 14 to 21, a more detailed description will be given substantially of those features which differ from those of FIGS. 1 to 13.

Figure 14:
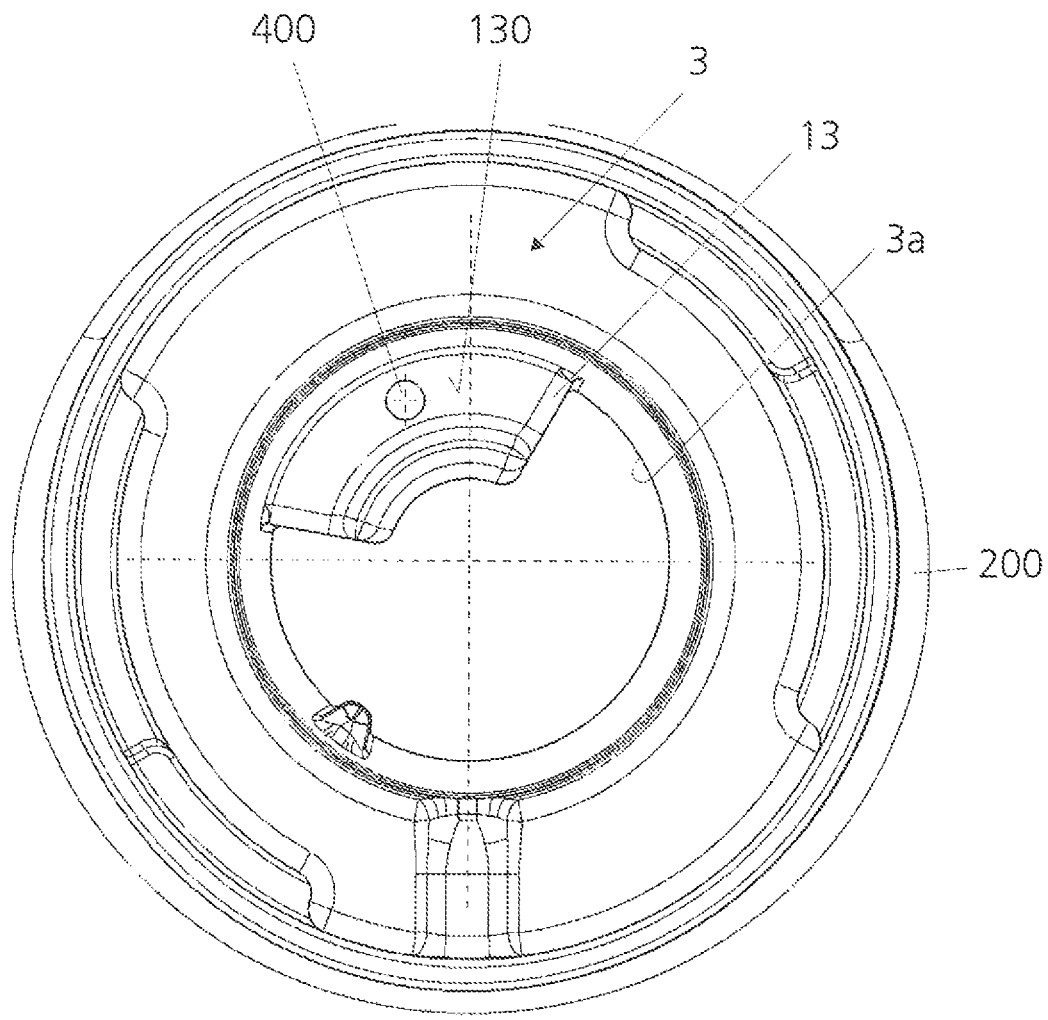
FIG. 14 shows a plan view of a filler neck holder formed in an inlet opening of a metallic outer skin.

FIG. 14 shows an embodiment of the filler neck holder 3 with only one narrowing step or one projection 13 or one protuberance. For simplification, this will be referred to hereinafter only as a projection 13. The disclosure is however intended to apply equally to a narrowing step or a narrowing or a protuberance. The projection 13 is designed such that, when the filler neck 4 is inserted into the filler neck holder 3, the projection 13 is situated below the annular chamber 6. The projection 13 reduces the available free diameter of the filler neck holder 3, such that the inner diameter of the filler neck holder 3 is smaller than the outer diameter of the annular magnet 7, at least in a partial region. The projection 13 has a surface 130 which, as seen in a plan view, is substantially in the shape of a circular arc.

The filler neck holder 3 illustrated in FIG. 14 is shrink-fitted, in the way already described, onto a filler neck 4. Here, the filler neck 4 may have a design such as has already been described with regard to the embodiments as per FIGS. 1 to 13.

Figure 19:
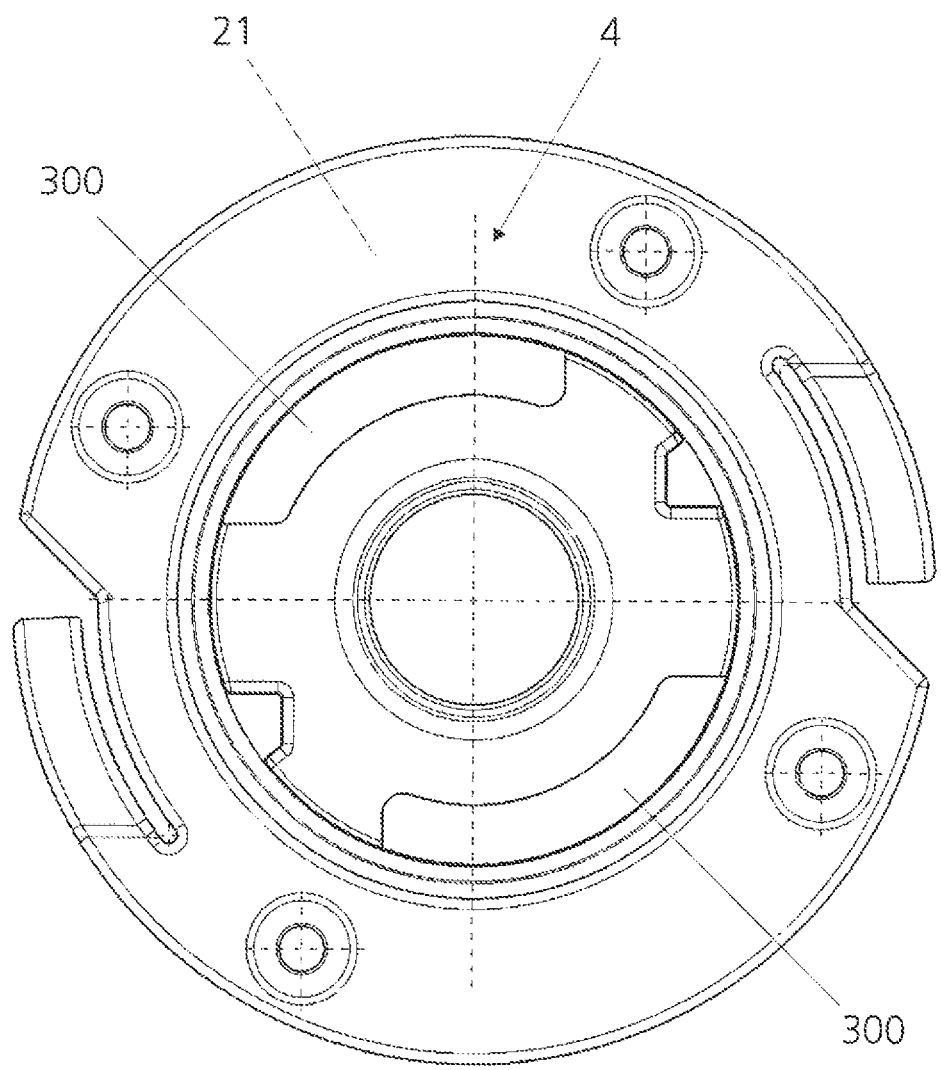
FIG. 19 illustrates a plan view from above of the filler neck, whereby to make the ventilation ducts more clearly visible, the locking members for a cap are not illustrated.
Figure 20:
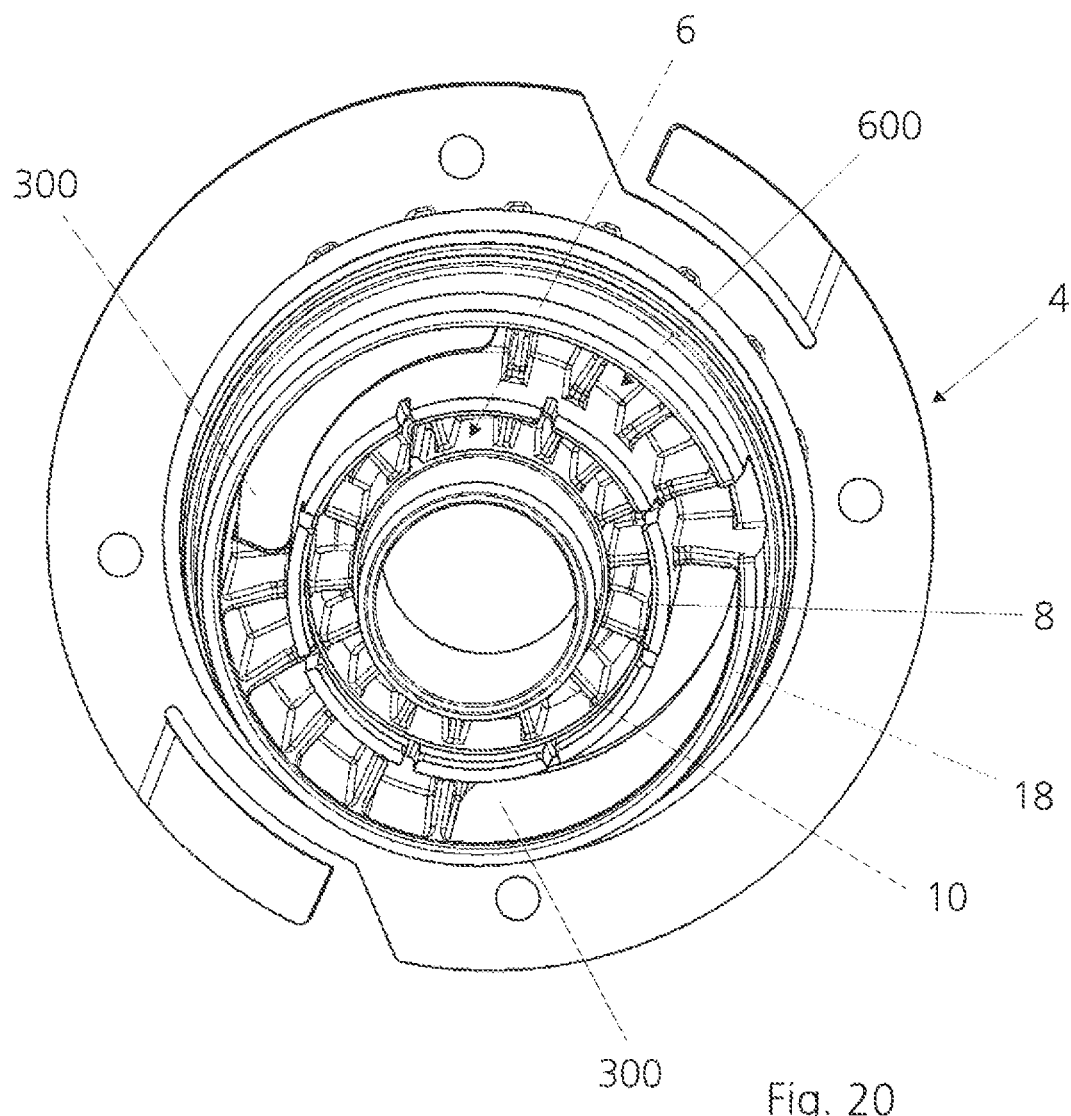
FIG. 20 illustrates a slightly perspective view from below of the filler neck illustrated in FIG. 19.
Figure 21:
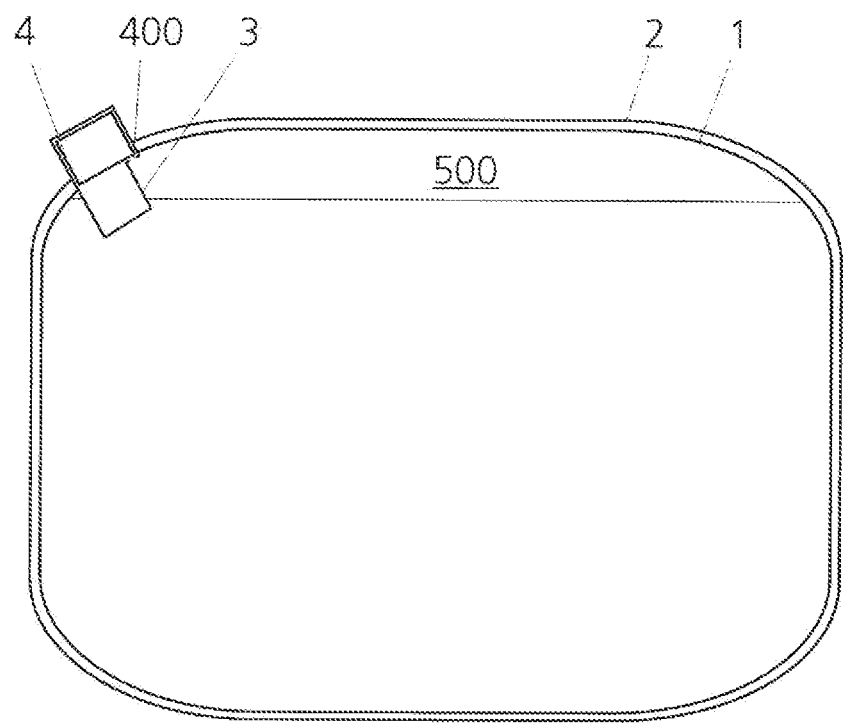
FIG. 21 illustrates a diagrammatic view of a plastic vessel with a ventilation bore in the filler neck holder.

A plan view of a possible embodiment of the filler neck 4 is illustrated in FIG. 19, and a view from below is illustrated in FIG. 20. The filler neck 4 illustrated in FIGS. 19 and 20 has two ventilation ducts 300, wherein those ends of the ventilation ducts which are directed toward the interior space of the vessel 1 may be at least partially covered by one or if appropriate more projections of the filler neck holder 3. In the embodiment illustrated in FIGS. 14 to 21, it is provided that only one of the two ventilation ducts 300 is covered by the projection 13 or by the surface 130 thereof. The ventilation duct 300, which extends substantially in the axial direction, therefore does not extend rectilinearly or axially into the interior space of the vessel.

There is an axial distance between that end of the ventilation duct 300 which faces toward the interior space of the vessel and the surface 130 of the projection 13, such that air can flow, bypassing the projection 13, from the interior space into the ventilation duct 300. The escape of liquid is, however, hindered considerable because there is no rectilinear connection between the interior space of the vessel and the ventilation duct 300. It is self-evidently also possible for a plurality of projections 13 to be provided, which if appropriate close off a plurality of ventilation ducts 300.

Figure 15:
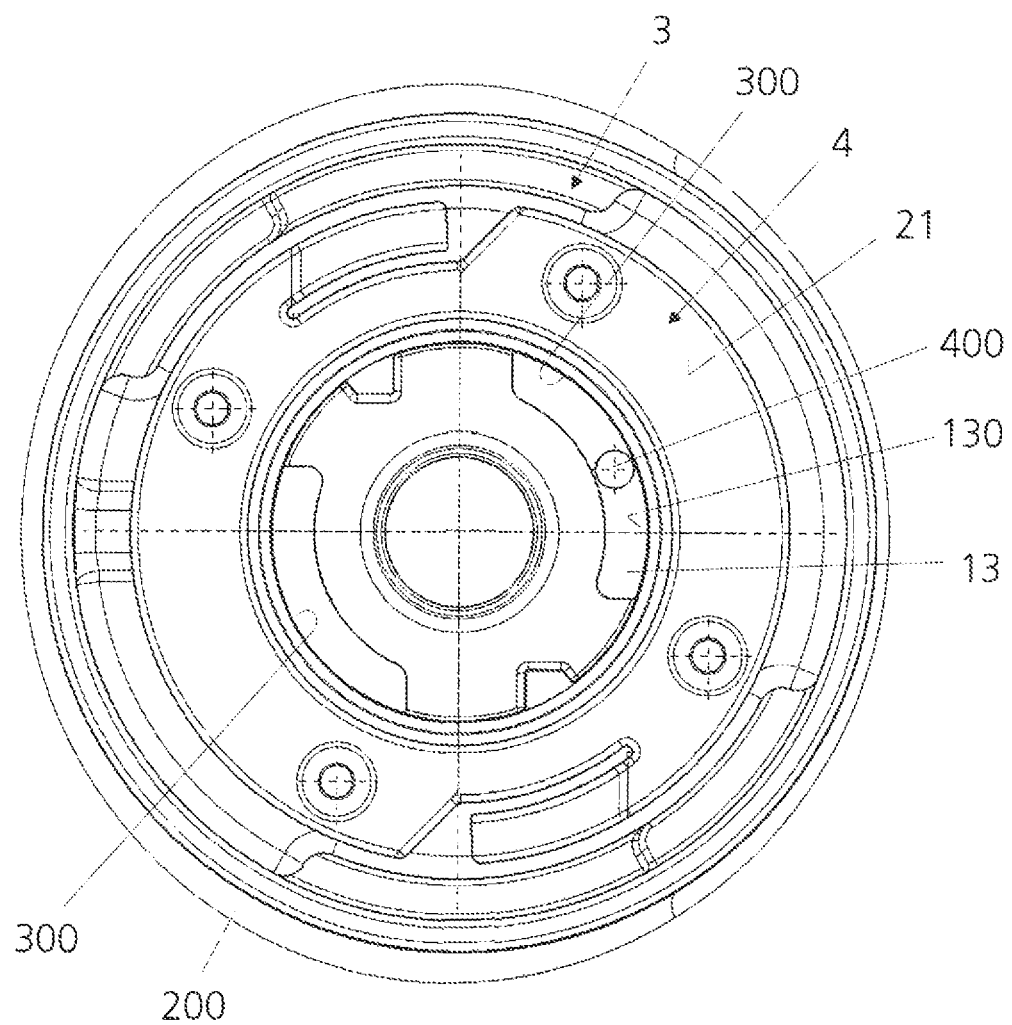
FIG. 15 illustrates the filler neck holder of 4, with the filler neck holder having been shrink-fitted onto a filler neck.
Figure 16:
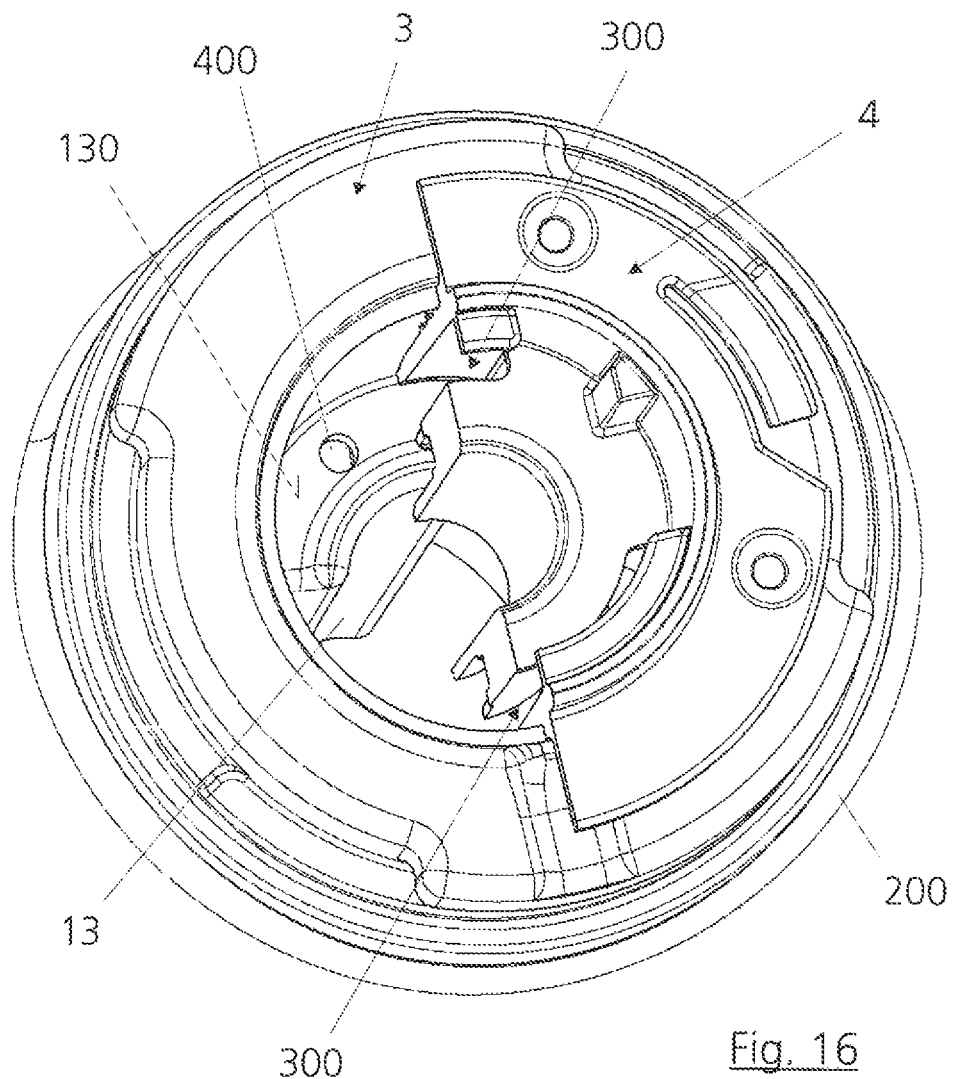
FIG. 16 illustrates the filler neck holder of FIG. 15, whereby the filler neck is illustrated in a longitudinal section.
Figure 17:
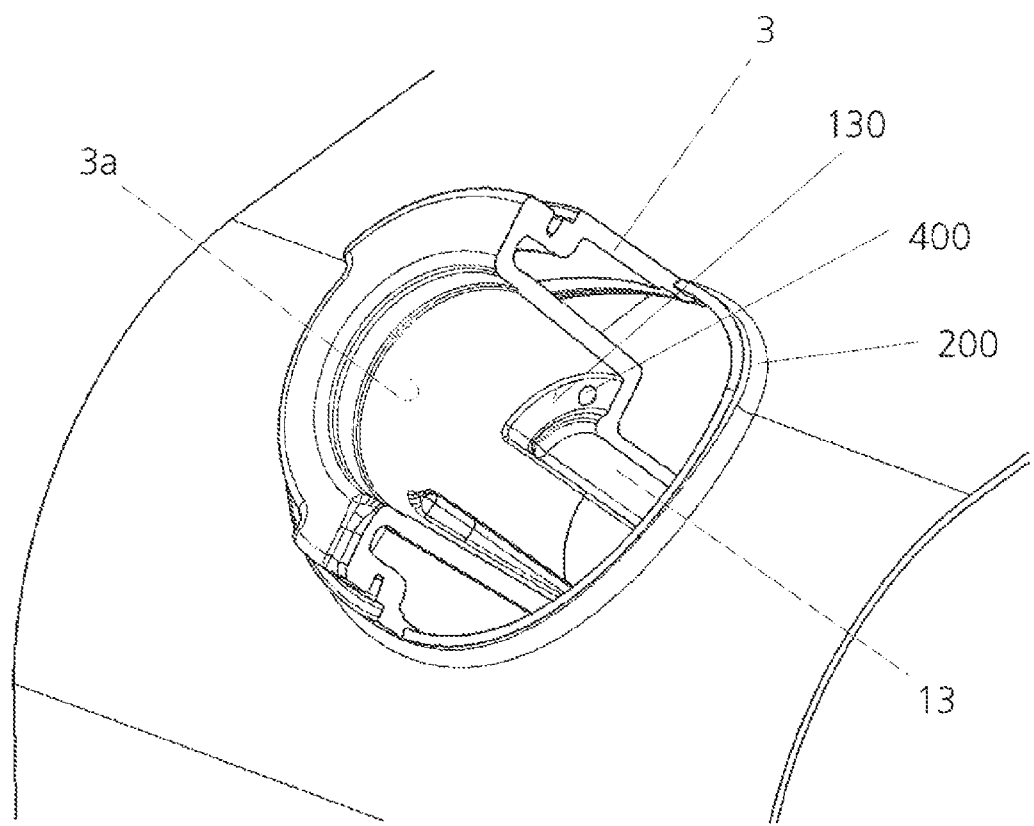
FIG. 17 illustrates a perspective view of a longitudinal section through the filler neck holder of FIG. 14.
Figure 18:
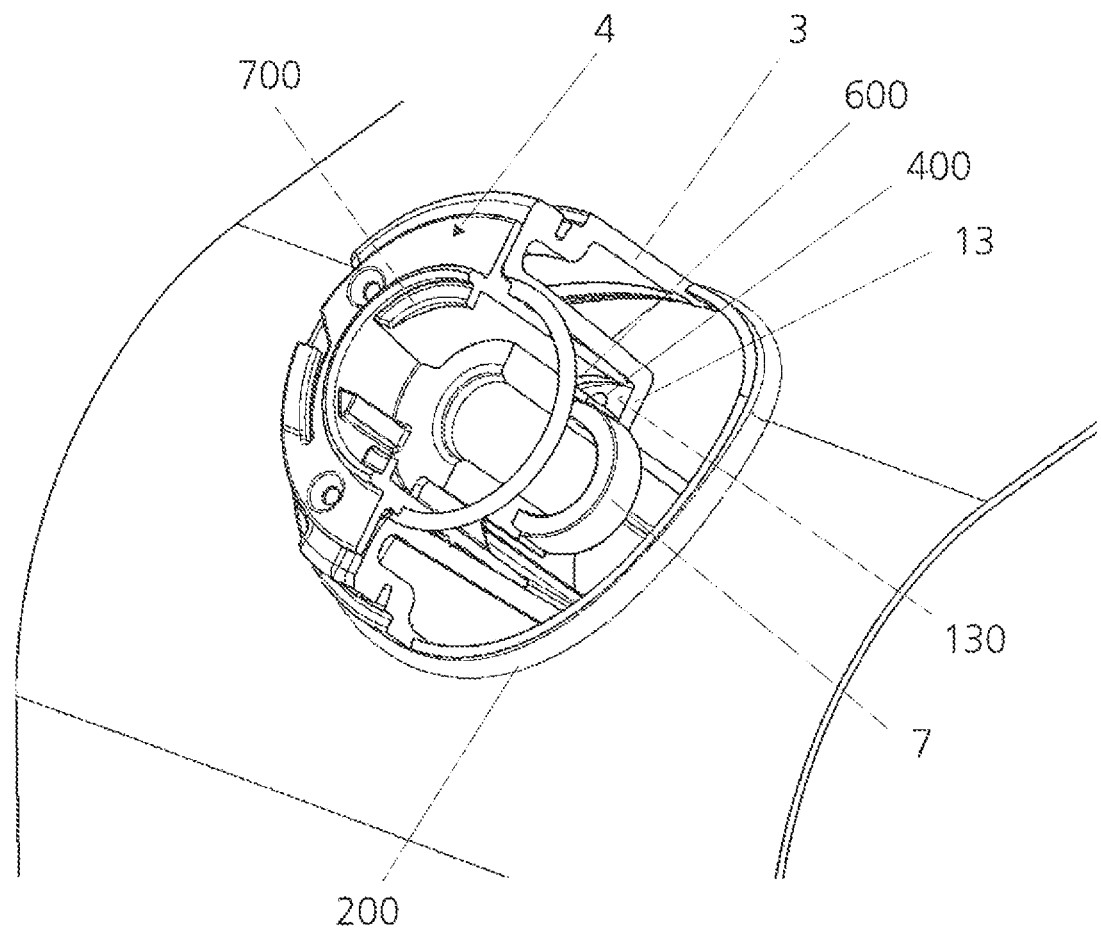
FIG. 18 illustrates a perspective view of a longitudinal section through the filler neck holder and the filler neck of FIG. 15.

FIG. 15 shows an illustration in which the filler neck holder 3 has been shrink-fitted onto the filler neck 4 illustrated in FIGS. 19 and 20. It is provided here that one of the two ventilation ducts 300 of the filler neck 4 is not covered by a projection 13 as viewed in the axial direction, whereas the other ventilation duct 300 is covered by the projection 13 illustrated in FIG. 14, or by the surface 130 formed by the projection. It is self-evidently also possible for more or fewer ventilation ducts 300 or projections 13 to be provided. FIG. 16 is a sectional illustration of the installation situation shown in FIG. 15. It can be seen in FIG. 16, too, that air can flow, bypassing the projection 13, into the ventilation duct 300 covered by the projection 13.

The inventor has recognized that it is advantageous for that ventilation duct 300 whose end facing the interior space of the vessel 1 is closed of or reached last by a rising liquid level is at least partially covered by the projection 13. The inventor has recognized, in a way which is not obvious, that the risk of urea being sprayed out is greatest at that ventilation duct 300 which is closed off last by a rising liquid level (during tank fining). It is, therefore, advantageous if that ventilation duct 300 which is closed off last by the rising liquid level in the interior space of the vessel is provided with a spray guard, which can be realized particularly easily if the projection 13 which is provided in any case and which is intended to prevent the annular magnet 7 from falling out covers the ventilation duct 300 such that there is no rectilinear or axial passage into the interior space of the tank. It would self-evidently also be possible for a spray guard of the type to be provided independently of the projection, for example via a protruding lobe or a bulge. It has however proven in tests to be particularly expedient to use the projection 13 for this purpose.

The ventilation ducts 300 illustrated in FIGS. 14 to 20 have the shape of a circular arc as viewed in cross section. It is advantageous for the circular arc shape of the ventilation duct 300 which is to be closed off by the projection 13 to be at least approximately matched to the surface 130 of the projection 13, such that the support 130 of the projection 13 at least approximately completely blocks the ventilation duct 300 as viewed in the axial direction (see FIG. 15).

As can be seen from FIGS. 14, 16, 17, 18 and 21, it is advantageous for the projection 13 to be provided with a ventilation bore 400. Here, the ventilation bore 400 is arranged so as to produce a connection between the ventilation duct 300 and an air chamber 500 in the vessel, which air chamber is situated above the interior-space-side end of the filler neck holder. The air volume which is enclosed in the interior space of the vessel when the liquid level in the vessel is so high that an end, which faces toward the interior space, of the filler neck holder is completely closed off is allowed to expand to the outside via the ventilation bore 400. The ventilation bore 400 may have a diameter of for example 1 mm to 10 mm, preferably 5 mm+/−2 mm. These dimensions have proven to be particularly suitable for permitting an escape of air but as far as possible preventing urea from being sprayed out.

As can be seen in particular from FIGS. 14 to 20, but also from FIGS. 1 to 10, the filler neck 4 forms an annular free space 600 which surrounds the annular chamber 6 for the magnet 7 at the outside. The annular free space 600 is open downwardly in the direction of the interior space of the vessel, such that air can pass into the annular free space 600. Here, the annular free space 600 is connected to the ventilation ducts 300 so as to permit a flow of air which allows air in the vessel to flow to the outside through the ventilation ducts 300 during the filling of the vessel. To permit as advantageous an outflow of air as possible, it is particularly expedient for the ventilation ducts 300 to open out axially directly into the interior space of the vessel without any barrier or obstruction in the axial direction being present. As already described above, however, it has proven to be advantageous for the ventilation duct 300 which is closed off last by the liquid level to be blocked or covered in the axial direction by the projection 13.

The possibility illustrated in FIGS. 14 to 20 of screwing the filler neck 4 to the filler neck holder 3, if appropriate with the aid of screws 22, is optional.

In a way which is not illustrated in any more detail, an annular hood may be provided which covers the filler neck holder 3 including the flange-like widened portion 21 of the filler neck 4, and in so doing nevertheless leaves clear an opening for the insertion of the pump nozzle 5. A cap can be mounted or screwed onto the filler neck holder 3 or the filler neck via a bayonet connection or some other connection. For this purpose, the filler neck may optionally have locking members 700.

All of the variants of the filler neck holder 4 which have already been described above can be combined with all of the above-described variants of the filler neck holder 3.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A vessel for storing a fluid for vehicles, the vessel comprising:
 a vessel body defining an interior space, the vessel body including a filler neck holder; and
 a filler neck to receive a pump nozzle and which is received into the filer neck holder, the filler neck including a filler neck body having an inner wall and an outer wall defining an annular chamber, a radial projection at the inner wall of the filler neck body which projects into the annular chamber, and a magnet fixed in the annular chamber by the radial projection and which opens a closing mechanism of the pump nozzle to thereby permit a filling sequence, wherein the filler neck has on an outer circumference thereof a plurality of ribs extending radially, spaced apart and parallel to each other such that radially outer ends of the plurality of ribs form detent lugs to anchor the filler neck into the filler neck holder, wherein a shrink-fit connection is provided between an inner wall of the filler neck holder and the radially outer ends of the ribs.

2. The vessel of claim 1, wherein the annular chamber opens downwardly in a direction of an interior space of the vessel.

3. The vessel of claim 1, wherein the radial projection is arranged below the magnet when the magnet is received into the annular chamber.

4. The vessel of claim 1, wherein the outer wall and the inner wall of the filler neck body clamps the magnet in the annular chamber.

5. The vessel of claim 1, wherein the outer wall of filler neck body has a plurality of axially extending slots to permit the magnet to be held in the annular chamber by a certain preload.

6. The vessel of claim 1, wherein the inner wall of filler neck body has a plurality of axially extending slots to permit the magnet to be held in the annular chamber by a certain preload.

7. The vessel of claim 1, wherein the inner wall of filler neck body has an inner region which receives and guides the pump nozzle.

8. The vessel of claim 1, wherein the inner diameter of the filler neck holder is less than the outer diameter of the magnet, at least in a partial region.

9. The vessel of claim 1, wherein the filler neck holder has a pair of steps which extending radially towards filler neck and which are situated below the annular chamber when the filler neck is received into the filler neck holder.

10. The vessel of claim 9, wherein the steps are formed opposite one another and enclose approximately an angle range of 30 to 90°.

11. The vessel of claim 1, wherein an inner wall of the filler neck holder has an end stop defining a depth to which the filler neck is received into the filler neck holder.

12. The vessel of claim 11, wherein a contact surface of the filler neck bears against the end stop when the filler neck is situated in an intended position within the filler neck holder.

13. The vessel of claim 12, wherein the end stop comprises an encircling step.

14. The vessel of claim 1, wherein an underside of a lowermost one of the ribs forms a contact surface for contact against an end stop of the filler neck holder when the filler neck is situated in an intended position within the filler neck holder.

15. The vessel of claim 1, further comprising stiffening walls extending axially at the outer wall of the filler neck to define ventilation bores.

16. The vessel of claim 1, wherein the vessel is formed from a plastic.

17. The vessel of claim 1, wherein the filler neck is formed from plastic.

18. The vessel of claim 1, wherein the magnet comprises a magnetized plastic.

19. The vessel of claim 1, wherein the magnet is encased in an epoxy resin.

20. The vessel of claim 1, wherein the magnet is formed of a material which is resistant to urea.

21. The vessel of claim 1, wherein the vessel is part of a storage tank of a utility vehicle.

22. The vessel of claim 1, wherein the vessel forms the interior space of a storage tank of a utility vehicle.

23. The vessel of claim 1, wherein the vessel is formed as a plastic coating of a storage tank of a utility vehicle.

* * * * *